United States Patent
Suzuki et al.

(10) Patent No.: US 12,260,888 B1
(45) Date of Patent: Mar. 25, 2025

(54) MAGNETIC DISK APPARATUS AND METHOD

(71) Applicants: Kabushiki Kaisha Toshiba, Tokyo (JP); Toshiba Electronic Devices & Storage Corporation, Tokyo (JP)

(72) Inventors: Sho Suzuki, Tokyo (JP); Naoki Tagami, Yokohama Kanagawa (JP); Takeyori Hara, Kawasaki Kanagawa (JP); Takayuki Kawabe, Sagamihara Kanagawa (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 18/588,861

(22) Filed: Feb. 27, 2024

(30) Foreign Application Priority Data

Sep. 20, 2023 (JP) .................... 2023-152535

(51) Int. Cl.
| | |
|---|---|
| G11B 5/54 | (2006.01) |
| G11B 5/012 | (2006.01) |
| G11B 5/596 | (2006.01) |
| G11B 20/10 | (2006.01) |
| G11B 21/10 | (2006.01) |

(52) U.S. Cl.
CPC .......... G11B 5/59688 (2013.01); G11B 5/012 (2013.01); G11B 20/10222 (2013.01); G11B 21/106 (2013.01)

(58) Field of Classification Search
CPC ......... G11B 5/54; G11B 5/58; G11B 5/59633; G11B 15/087; G11B 15/52; G11B 5/59627; G11B 5/59688; G11B 5/59655

USPC .................... 360/75, 77.01, 77.05
See application file for complete search history.

(56) References Cited

U.S. PATENT DOCUMENTS

| | | | |
|---|---|---|---|
| 6,771,443 B2 * | 8/2004 | Szita | G11B 5/59633 |
| | | | 360/75 |
| 7,616,399 B1 | 11/2009 | Chen et al. | |
| 8,867,162 B2 | 10/2014 | Sudo | |
| 10,748,569 B1 | 8/2020 | Ogawa et al. | |
| 12,051,452 B1 | 7/2024 | Tagami | |

FOREIGN PATENT DOCUMENTS

JP           2024-137019 A          10/2024

* cited by examiner

*Primary Examiner* — Nabil Z Hindi
(74) *Attorney, Agent, or Firm* — Kim & Stewart LLP

(57) ABSTRACT

According to the embodiment, a controller of a magnetic disk apparatus acquires a first amplitude and a first phase of a first read waveform and a second amplitude and a second phase of a second read waveform by demodulating the first/second read waveforms. The first read waveform is a read waveform of a first burst pattern. The second read waveform is a read waveform of a second burst pattern. The controller acquires weights on the basis of the first amplitude, the second amplitude, the first phase, and the second phase. The controller corrects an initial phase of each of the first read waveform and the second read waveform by calculating a weighted average using the weights, the first phase, and the second phase. The controller executes positioning of the magnetic head on the basis of the corrected first read waveform and second read waveform.

20 Claims, 11 Drawing Sheets

MAGNETIC DISK APPARATUS AND METHOD

CROSS-REFERENCE TO RELATED APPLICATIONS

This application is based upon and claims the benefit of priority from Japanese Patent Application No. 2023-152535, filed on Sep. 20, 2023; the entire contents of which are incorporated herein by reference.

FIELD

Embodiments described herein relate generally to a magnetic disk apparatus and a method.

BACKGROUND

In a magnetic disk apparatus, burst patterns used for positioning a magnetic head are stored in a servo sector on a magnetic disk. In recent years, in order to implement a large capacity of a magnetic disk apparatus, there is a magnetic disk apparatus in which one or more short servo sectors are disposed between two ordinary servo sectors (hereinafter, referred to as normal servo sectors) in the circumferential direction. The short servo sector is a servo sector that has a shorter circumferential length than the normal servo sector.

In addition to the burst patterns, data called a servo mark is recorded in the normal servo sector. For the normal servo sector, a burst gate indicating timing to read burst patterns is generated on the basis of a servo mark. However, for the short servo sector, a burst gate is generated without using a servo mark. Therefore, in the short servo, the positioning accuracy may deteriorate as the read timing of the burst patterns deviates from the proper timing.

DETAILED DESCRIPTION

According to an embodiment of the present disclosure, a magnetic disk apparatus includes a magnetic disk, a magnetic head, and a controller. On the magnetic disk, multiple servo sectors are provided in a circumferential direction. The multiple servo sectors each store a first burst pattern and a second burst pattern. The magnetic head is configured to execute writing and reading on the magnetic disk. Upon the magnetic head passes over a first servo sector being one of the multiple servo sectors, the controller performs processing as follows. The controller identifies read timing of the first burst pattern and the second burst pattern, and reads, at the read timing, the first burst pattern and the second burst pattern from the first servo sector. The controller acquires a first amplitude and a first phase of a first read waveform and a second amplitude and a second phase of a second read waveform by demodulating the first read waveform and the second read waveform. The first read waveform is a read waveform of the first burst pattern. The second read waveform is a read waveform of the second burst pattern. The controller acquires weights on the basis of the first amplitude, the second amplitude, the first phase, and the second phase. The controller corrects an initial phase of each of the first read waveform and the second read waveform on the basis of an initial phase correction value obtained by weighted average calculation using the weights, the first phase, and the second phase. The controller performs positioning of the magnetic head on the basis of the first read waveform and the second read waveform, each of whose initial phase has been corrected.

Hereinafter, a magnetic disk apparatus and a method according to an embodiment will be described in detail with reference to the accompanying drawings. Note that the present invention is not limited by embodiments below.

First Embodiment

Figure 1:
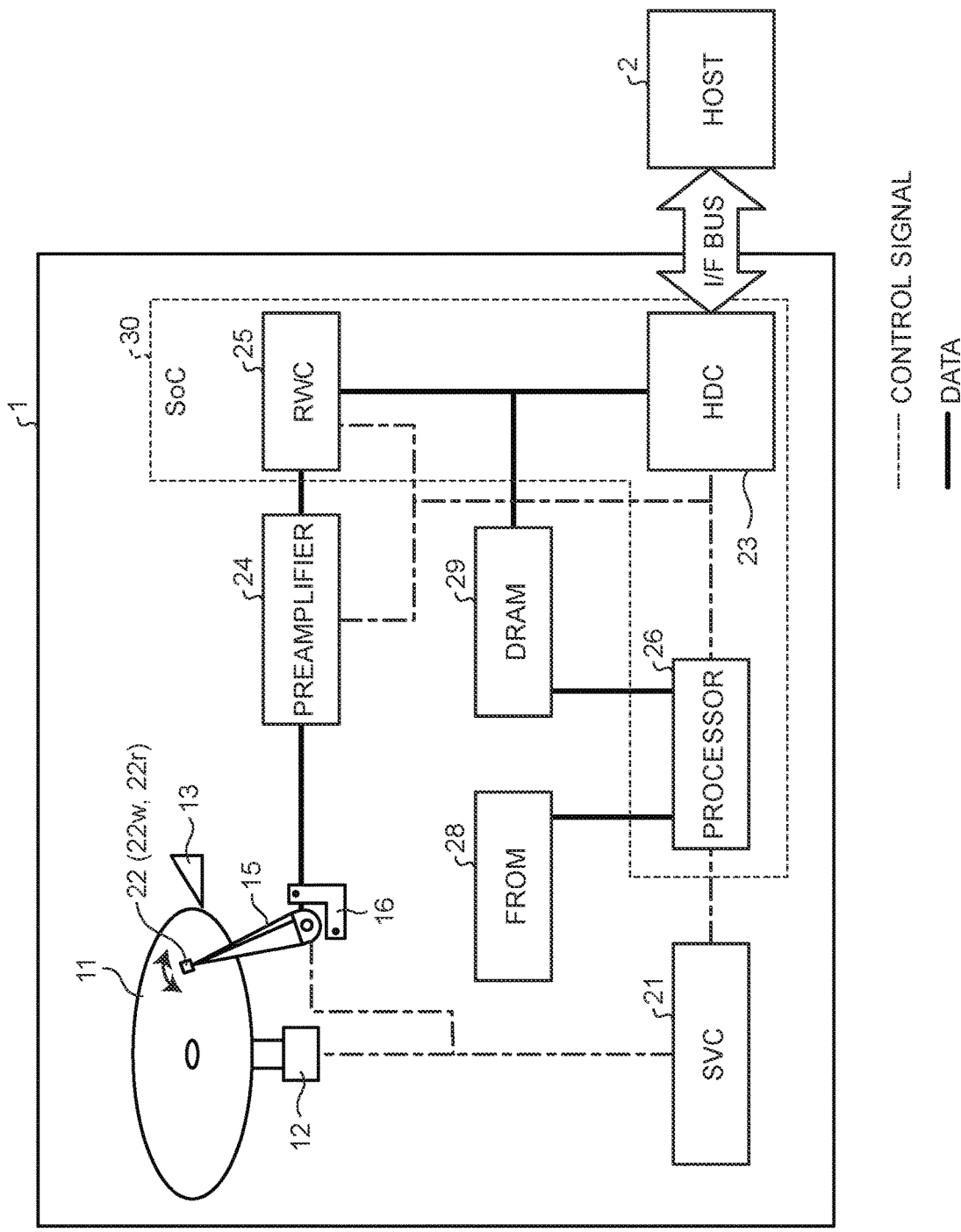
FIG. 1 is a schematic diagram illustrating an example of a configuration of a magnetic disk apparatus according to the first embodiment.

FIG. 1 is a schematic diagram illustrating an example of a configuration of a magnetic disk apparatus 1 according to the first embodiment.

The magnetic disk apparatus 1 is connected to a host 2. The magnetic disk apparatus 1 can receive an access command from the host 2. The access command is, for example, a write command or a read command.

The magnetic disk apparatus 1 includes a magnetic disk 11 having a magnetic layer formed on a face thereof. The magnetic disk apparatus 1 performs access to a magnetic disk 11 in response to the access command. The access includes writing of data and reading of data. Specifically, data is written and read by a magnetic head 22.

In addition to the magnetic disk 11, the magnetic disk apparatus 1 includes a spindle motor (SPM) 12, a ramp 13, an actuator arm 15, a voice coil motor (VCM) 16, a servo controller (SVC) 21, a magnetic head 22, a hard disk controller (HDC) 23, a preamplifier 24, a read/write channel (RWC) 25, a processor 26, a flash read only memory (FROM) 28, and a dynamic random access memory (DRAM) 29.

The magnetic disk 11 is rotated at a predetermined rotation speed by the SPM 12 attached coaxially.

The SVC 21 is an integrated circuit having a function as a driver that drives the SPM 12 and the VCM 6. Through the SVC 21, the processor 26 controls the rotation of the SPM 12 and the rotation of the VCM 16.

The magnetic head 22 performs writing and reading on the magnetic disk 11 by a write head 22w and a read head 22r provided therein. The magnetic head 22 is attached to a distal end of the actuator arm 15. The magnetic head 22 is moved in the radial direction of the magnetic disk 11 by the VCM 16 driven by the SVC 21. Note that one or both of the write head 22w and the read head 22r may be provided in a single magnetic head 22 in plurality.

For example, when the rotation of the magnetic disk 11 is stopped, the magnetic head 22 is moved onto the ramp 13. The ramp 13 holds the magnetic head 22 at a position separated from the magnetic disk 11.

The preamplifier 24 is an integrated circuit that writes and reads data via the magnetic head 22. The preamplifier 24 amplifies and outputs a signal read from the magnetic disk 11 by the magnetic head 22 in the read operation, and supplies the signal to the RWC 25. In addition, the preamplifier 24 amplifies a signal corresponding to the data to be written supplied from the RWC 25 and supplies the amplified signal to the magnetic head 22 in the write operation.

The HDC 23 controls transmission and reception of data with the host 2 via the I/F bus, controls the DRAM 29, and the like.

The DRAM 29 is used as a buffer for data to be transmitted to and received from the host 2. For example, the DRAM 29 is used for temporarily storing data to be written or data read from the magnetic disk 11.

The DRAM 29 is used as an operation memory by the processor 26. The DRAM 29 is used as an area in which a firmware program is loaded and an area in which various types of management data are temporarily stored.

The RWC 25 modulates data to be written supplied from the HDC 23 and supplies the modulated data to the preamplifier 24. The RWC 25 demodulates a signal read from the magnetic disk 11 and supplied from the preamplifier 24, including error correction, to output the demodulated signal to the HDC 23 as digital data.

The processor 26 is, for example, a central processing unit (CPU). A flash read only memory (FROM) 28 and a DRAM 29 are connected to the processor 26.

The FROM 28 stores a firmware program, various setting information, etc.

The processor 26 performs overall control of the magnetic disk apparatus 1 in accordance with a firmware program stored in the FROM 28 or the magnetic disk 11. For example, the processor 26 loads a firmware program from the FROM 28 or the magnetic disk 11 into the DRAM 29, and controls, in accordance with to the firmware program loaded into the DRAM 29, the SVC 21, the preamplifier 24, the RWC 25, the HDC 23, and the like.

The firmware program may be stored in the magnetic disk 11. Some of or all functions of the processor 26 may be implemented by a hardware circuit such as a field-programmable gate array (FPGA) or an application specific integrated circuit (ASIC).

The HDC 23, the RWC 25, and the processor 26 are configured as a system-on-a-chip (SoC) 30 that is a single integrated circuit. In addition to these components, the SoC 30 may include other elements (for example, the FROM 28, the DRAM 29, or the like). Note that the SoC 30 is an example of a controller.

Figure 2:
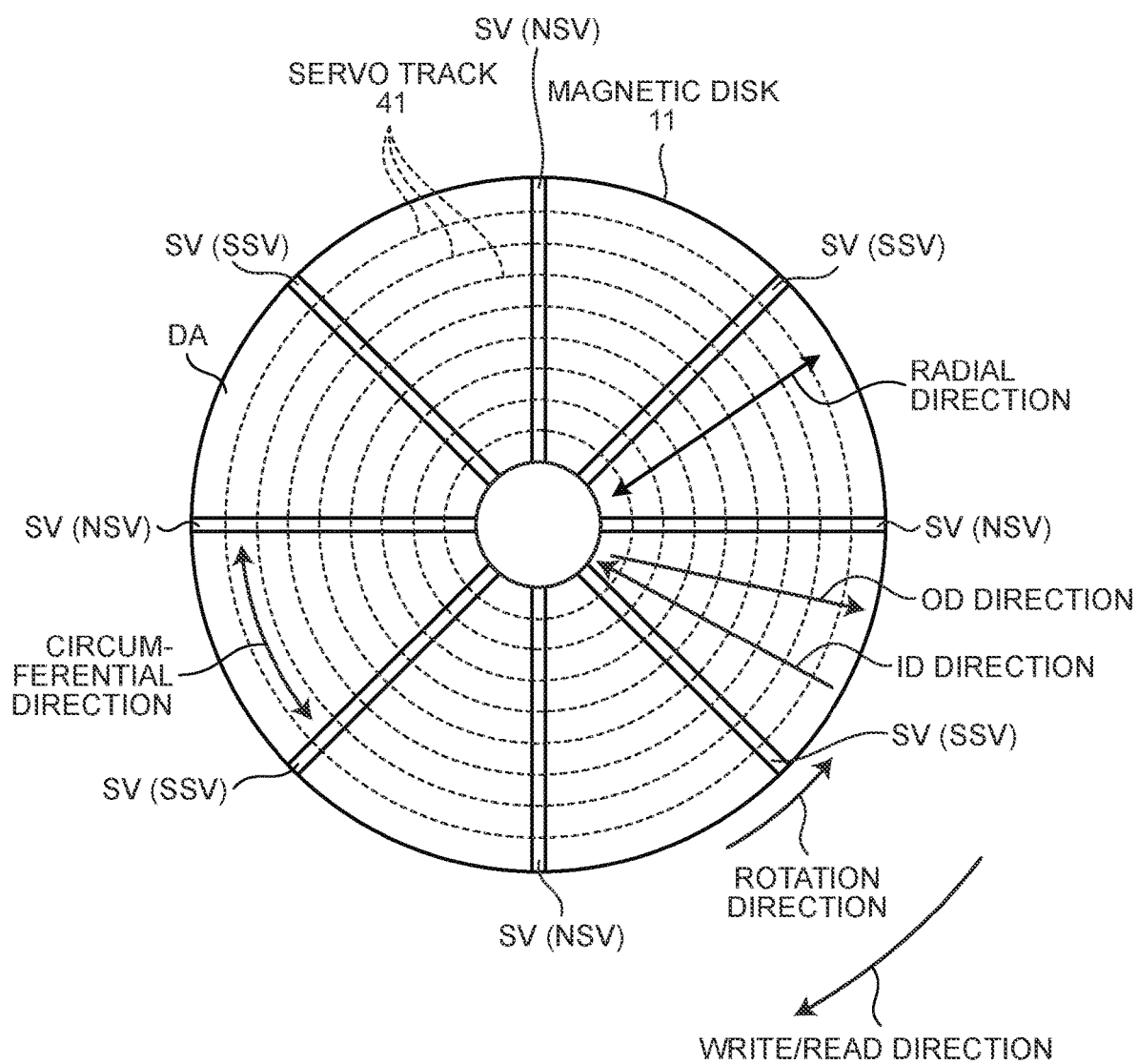
FIG. 2 is a schematic diagram illustrating an example of a configuration of a magnetic disk according to the first embodiment.

FIG. 2 is a schematic diagram illustrating an example of a configuration of the magnetic disk 11 according to the first embodiment. Note that this figure illustrates an example of the rotation direction of the magnetic disk 11. The magnetic head 22 moves relative to the magnetic disk 11 by the rotation of the magnetic disk 11. Therefore, the write/read direction, namely, the direction in which data is written or read by the magnetic head 22 in the circumferential direction is opposite to the rotation direction of the magnetic disk 11.

In the radial direction, a direction from the edge to the center of the magnetic disk 11 is an inner diameter (ID) direction, and a direction from the center to the edge of the magnetic disk 11 is an outer diameter (OD) direction.

Servo data used for positioning the magnetic head 22 is written to the magnetic disk 11 by, for example, a servo writer or self-servo write (SSW) in a manufacturing process. According to FIG. 2, servo areas SV disposed radially in the radial direction and at predetermined intervals in the circumferential direction are drawn as an example of the arrangement of the servo areas in which the servo data is written. A data area DA where data is written is provided between two servo areas SV adjacent to each other in the circumferential direction.

The servo areas SV include a normal servo area NSV and a short servo area SSV. At least one or more short servo areas SSV are disposed between two normal servo areas NSV continuously disposed in the circumferential direction, in other words, between two adjacent normal servo areas NSV. According to the example illustrated in FIG. 2, the normal servo area NSV and the short servo area SSV are alternated in the circumferential direction.

Concentric servo tracks 41 are provided in the radial direction of the magnetic disk 11. The servo data written in a servo area SV is used for positioning control of the magnetic head 22.

More specifically, on the magnetic disk 11, concentric data tracks are provided above areas where the servo tracks 41 are provided. The servo tracks 41 may be used as data tracks. Data tracks different from the servo tracks 41 may be provided. Data sectors continuously arranged in the circumferential direction are provided in an area segmented by the data area DA on each data track. Data may be written to each data sector. Note that data that can be written to each data sector includes user data received from the host 2, metadata (for example, error correction code) accompanying the user data, system data, and the like. The magnetic disk apparatus 1 holds in advance the setting of the positional relationship between the servo tracks 41 and the data tracks, and performs positioning control to position the magnetic head 22 on the target data track on the basis of the servo data recorded in the servo area SV. The positioning control includes a seek operation, which is an operation of moving the magnetic head 22 in the radial direction toward the target data track, a tracking operation of maintaining the magnetic head 22 on the target data track, and the like. Hereinafter, an area segmented by the normal servo area NSV on the servo track 41 is denoted as a normal servo sector NSV. An area segmented by the short servo area SSV on the servo track 41 is denoted as a short servo sector SSV. In addition, the normal servo sector NSV and the short servo sector SSV are collectively referred to as servo sectors SV.

The positional relationship between two areas in the circumferential direction in the present specification will be defined. When the first data and the second data are written in the write/read direction and the first data is written in an area to be read before the second data, it is considered that the area in which the first data is written is located before the area in which the second data is written. It is considered that the area where the second data is written is located after the area where the first data is written.

Moreover, when the magnetic head 22 passes over a certain area in the circumferential direction, a part where the magnetic head 22 first passes in the area is considered as the start of the area. When the magnetic head 22 passes over a certain area in the circumferential direction, a part where the magnetic head 22 finally passes in the area is considered as the end of the area.

Figure 3:
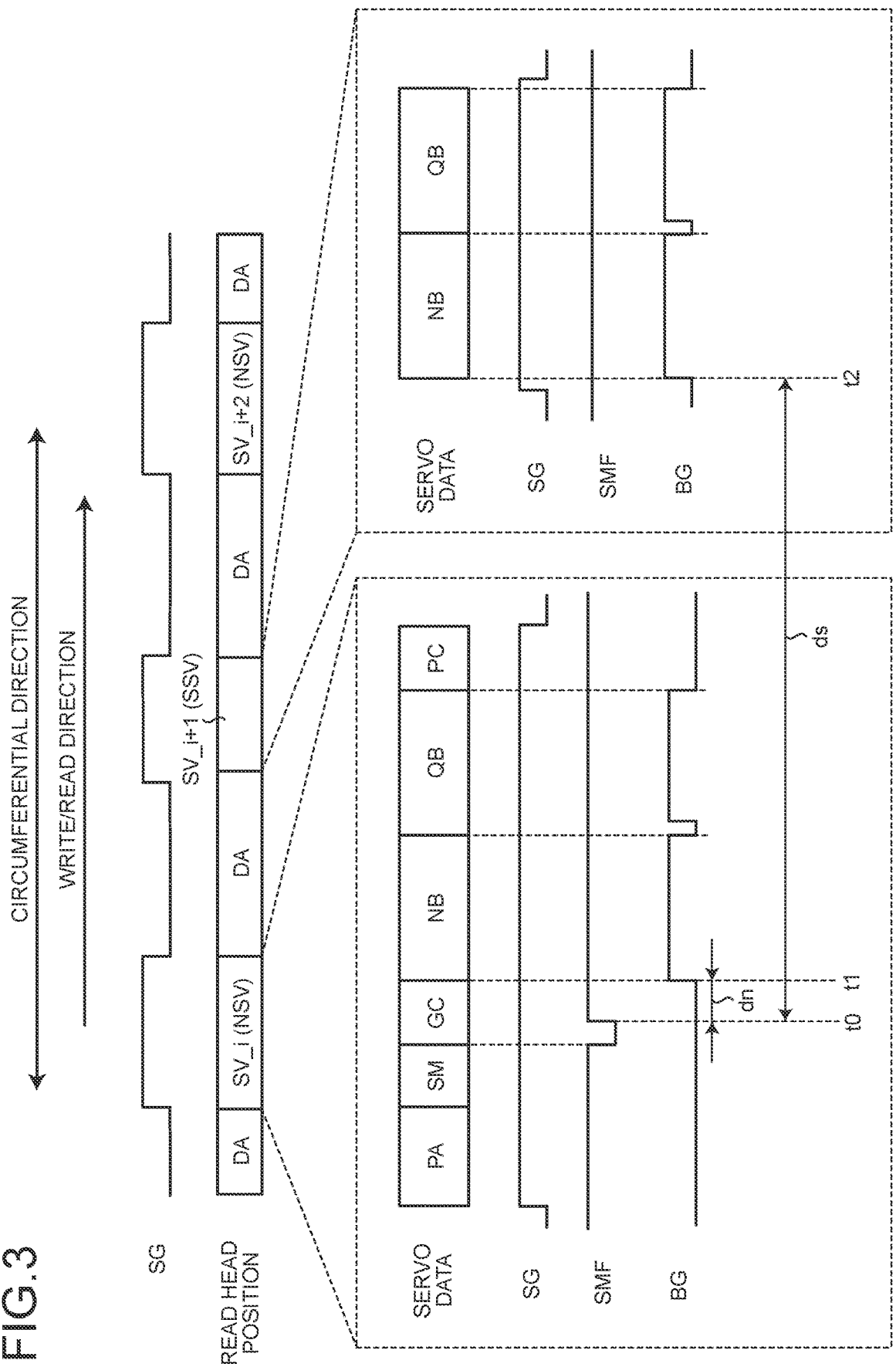
FIG. 3 is a diagram illustrating an example of a configuration of a normal servo sector and a short servo sector according to the first embodiment.

FIG. 3 is a diagram illustrating an example of a configuration of a normal servo sector NSV and a short servo sector SSV according to the first embodiment.

The configurations of all the normal servo sectors NSV are common. In addition, the configurations of all the short servo sectors SSV are common. FIG. 3 illustrates a configuration of a servo sector SV_i which is a normal servo sector NSV as a representative of the normal servo sector NSV. In addition, as a representative of the short servo sector SSV, a configuration of the servo sector SV_i+1 disposed between the servo sector SV_i that is a normal servo sector NSV and the servo sector SV_i+2 that is a normal servo sector NSV is illustrated.

As illustrated in FIG. 3, in the normal servo sector NSV, a preamble PA, a servo mark SM, a gray code GC, an N burst NB, a Q burst QB, and a post code PC are recorded in this order in the write/read direction.

The preamble PA is pattern data of a single period that periodically changes in the circumferential direction. The preamble PA is used for adjusting the amplitude, the phase, and the frequency of the sampling data when the servo waveform read by the read head 22r is captured as the sampling data in the RWC 25 on the basis of the servo clock. The servo clock is generated by the RWC 25.

The servo mark SM is pattern data for identifying a servo data read timing. The SoC 30 identifies the read timing of various servo data on the basis of the detection timing of the servo mark SM and a count value of a counter (not illustrated) provided in this SoC 30. A specific example of the read timing of various servo data based on the detection timing of the servo mark SM will be described later.

The gray code GC includes a cylinder address for identifying each servo track 41 provided on the magnetic disk 11 and a sector address for identifying each servo sector SV on the servo track 41.

The N burst NB and the Q burst QB are pattern data used for detecting an offset amount of the position of the magnetic head 22 from the track center of a certain servo track 41 (more precisely, the servo track 41 indicated by the cylinder address). Each of the N burst NB and the Q burst QB is also referred to as a burst pattern. Note that the N burst NB is an example of a first burst pattern, and the Q burst QB is an example of a second burst pattern.

Each burst pattern is captured by the RWC 25 at a sampling interval that is based on the servo clock. The RWC 25 performs, for example, discrete Fourier transform (DFT) processing as one of demodulation operations on the waveforms of the respective captured burst patterns, thereby acquiring a phase and an amplitude. The SoC 30 (for example, the processor 26) calculates an offset amount of the magnetic head 22 from the track center of the servo track 41 on the basis of the phase and the amplitude acquired by the RWC 25. The SoC 30 (for example, the processor 26) calculates an estimated position of the magnetic head 22 in the radial direction on the basis of the cylinder address obtained from the gray code GC and the offset amount obtained from each burst pattern.

Hereinafter, the waveform of the burst pattern captured in the RWC 25 is denoted as a read waveform. Moreover, an offset amount of the position of the magnetic head 22 from the track center detected on the basis of the burst pattern is denoted as a burst offset. Moreover, the estimated position of the magnetic head 22 in the radial direction is denoted as a demodulated position.

The post code PC is data for correcting a positional deviation of the shape of the servo track 41 defined by the gray code GC, the N burst NB, and the Q burst QB from the shape of the ideal servo track 41. The degree of this positional deviation varies in synchronization with the rotation of the magnetic disk 11. Therefore, the positional deviation is also referred to as repeatable runout (RRO). The post code PC is data for correcting the RRO. The SoC 30 corrects the demodulation position using the post code PC.

In FIG. 3, an example of waveforms of a servo gate signal SG, a burst gate signal BG, and a servo mark found signal SMF is further illustrated.

The servo gate signal SG is a signal transmitted by the processor 26 to the RWC 25. The servo gate signal SG represents a period during which reading of servo data is permitted. In FIG. 3, the servo gate signal SG at the "H" level indicates that reading of the servo data is permitted, and the servo gate signal SG at the "L" level indicates that reading of the servo data is not permitted. The RWC 25 reads the servo data in a period during which the servo gate signal SG is at the "H" level.

The burst gate signal BG is an internal signal of the RWC 25. The burst gate signal BG is a signal representing a period during which reading of burst patterns (namely, the N burst NB and the Q burst QB) is executed. In the example illustrated in FIG. 3, the timing at which the burst gate signal BG rises from the "L" level to the "H" level represents the timing at which reading of the burst pattern starts, and the timing at which the burst gate signal BG falls from the "H" level to the "L" level represents the timing at which reading of the burst pattern ends. The period during which the burst gate signal BG is maintained at "H" represents the read period of the burst pattern.

The servo mark found signal SMF is a signal representing whether the servo mark SM is correctly detected. The servo mark found signal SMF is controlled by, for example, the RWC 25 or the processor 26. In the example shown in FIG. 3, the servo mark found signal SMF is basically maintained at the "H" level. Then, upon the servo mark SM is correctly detected when the magnetic head 22 passes over the area where the servo mark SM is recorded, the servo mark found signal SMF falls to the "L" level and immediately rises to the "H" level.

When the magnetic head 22 passes over the normal servo sector NSV, the SoC 30 operates the burst gate signal BG with reference to the timing at which the servo mark found signal SMF rises.

The positional relationship between the area where each burst pattern is recorded and the area where the servo mark SM is recorded and the rotation speed of the magnetic disk 11 are already known. Therefore, the relationship between the timing at which the magnetic head 22 passes over the area where the servo mark SM is recorded and the timing at which the magnetic head 22 passes over the area where each burst pattern is recorded is already known. The rising and falling timings of the burst gate signal BG are determined on the basis of the relationship between these timings.

Specifically, when the SoC 30 can correctly detect the servo mark SM in the normal servo sector NSV, the SoC 30 lowers the servo mark found signal SMF and then immediately raises the servo mark found signal SMF (timing t0). The RWC 25 starts an operation of raising the burst gate signal BG at timing t1 at which a predetermined delay time dn has elapsed from timing t0, maintaining the burst gate signal BG at the "H" level for a predetermined period, and lowering the burst gate signal BG.

The operation of raising the burst gate signal BG, maintaining the burst gate signal BG at the "H" level for a predetermined period, and lowering the burst gate signal BG is executed for each of the N burst NB and the Q burst QB. The rising timing of the burst gate signal BG and the falling timing of the burst gate signal BG are set so that the read head 22r can read a predetermined partial area of the area in which the N burst NB is recorded in a period during which the burst gate signal BG is maintained at the "H" level for the first time. In addition, the rising timing of the burst gate signal BG and the falling timing of the burst gate signal BG are set so that the read head 22r can read a predetermined partial area of the area in which the Q burst QB is recorded in a period during which the burst gate signal BG is maintained at the "H" level for the second time.

Therefore, in the normal servo sector NSV, the RWC 25 can read a predetermined part of the N burst NB in a period during which the burst gate signal BG is maintained at the "H" level for the first time, and can read a predetermined part of the Q burst QB in a period during which the burst gate signal BG is maintained at the "H" level for the second time.

In the short servo sector SSV, the N burst NB and the Q burst QB are recorded in this order in the write/read direction. The short servo sector SSV has a configuration in which an area in which the preamble PA, the servo mark SM, the gray code GC, and the post code PC are recorded is omitted from the normal servo sector NSV. Therefore, the length of the short servo sector SSV in the circumferential direction is shorter than that of the normal servo sector NSV, and as a result, the amount of user data that can be recorded in the data area DA can be increased.

During a period when the read head 22r passes over the short servo sector SSV, the servo gate signal SG is maintained at the "H" level. More specifically, the operation of the servo gate signal SG is executed so as to maintain the servo gate signal SG at the "H" level in a period including a period when the magnetic head 22 passes over the area in which the N burst NB is recorded and the area in which the Q burst QB is recorded. The RWC 25 operates the burst gate signal BG in a period during which the servo gate signal SG is maintained at the "H" level. Then, the RWC 25 performs demodulation on the burst pattern read in the period defined by the burst gate signal BG.

The servo mark SM is not recorded in the short servo sector SSV. Therefore, the RWC 25 identifies the transition timing of the burst gate signal BG with reference to the timing at which the servo mark SM is detected when the magnetic head 22 passes over another servo sector SV corresponding to the normal servo sector NSV.

Specifically, the RWC 25 starts an operation of raising the burst gate signal BG at timing t2 at which a predetermined delay time ds has elapsed from timing t0 at which the servo mark found signal SMF is raised in the servo sector SV_i which is the normal servo sector NSV arranged immediately before, maintaining the burst gate signal BG at the "H" level for a predetermined period, and lowering the burst gate signal BG.

The operation of raising the burst gate signal BG, maintaining the burst gate signal BG at the "H" level for a predetermined period, and lowering the burst gate signal BG is executed for each of the N burst NB and the Q burst QB as in the case of reading each burst pattern from the normal servo sector NSV. Therefore, also in the short servo sector SSV, the RWC 25 can read a predetermined part of the N burst NB in a period during which the burst gate signal BG is maintained at the "H" level for the first time, and can read a predetermined part of the Q burst QB in a period during which the burst gate signal BG is maintained at the "H" level the for the second time.

Note that the configuration of the short servo sector SSV illustrated in FIG. 3 is merely an example. In the short servo sector SSV, the preamble PA, the servo mark SM, and the gray code GC may be recorded before the area in which the N burst NB is recorded. However, in positioning control during a specific operation (for example, an operation of writing data to the data area DA), as illustrated in FIG. 3, when the read head 22r passes over the short servo sector SSV, reading of the servo data is started from the N burst NB, and the servo data recorded before the area where the N burst NB is recorded is not read. As a result, the amount of user data that can be recorded in the data area DA can be increased.

Figure 4:
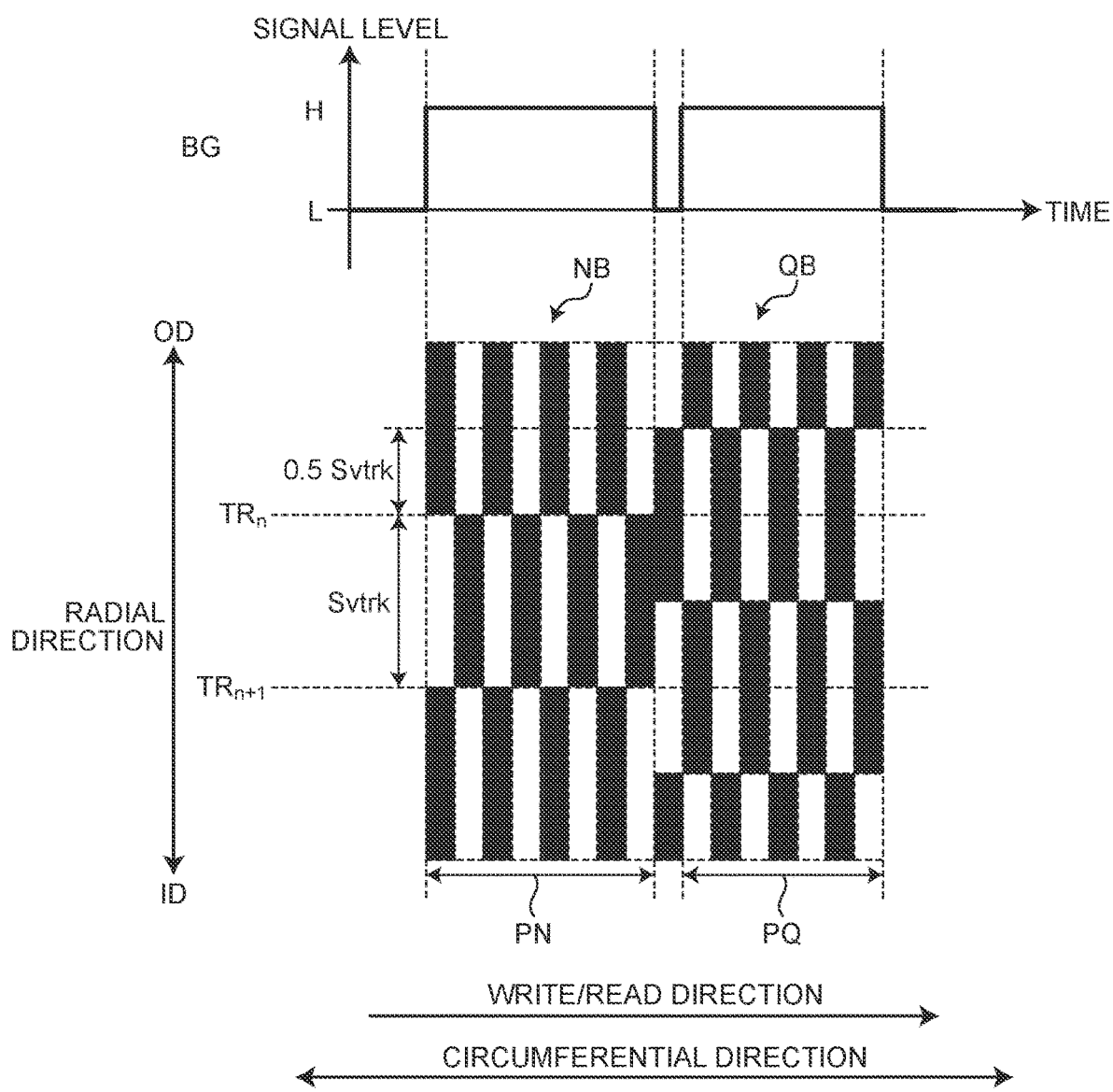
FIG. 4 is a diagram illustrating an example of a configuration of an N burst NB and a Q burst QB according to the first embodiment.

FIG. 4 is a diagram illustrating an example of a configuration of an N burst NB and a Q burst QB according to the first embodiment. The figure illustrates a configuration example of the N burst NB and the Q burst QB around a certain servo track TRn and a servo track TRn+1 adjacent to the servo track TRn. The blackened unit pattern indicates one (for example, magnetization of +polarity) of two values having different polarities, and the white unit pattern indicates the other (for example, magnetization of minus polarity) of the two values. Hereinafter, the blackened unit pattern is denoted as a first unit pattern, and the white unit pattern is denoted as a second unit pattern.

The length in the radial direction may be expressed in servo track units, in other words, in unit of spatial length in which the servo track pitch is regarded as 1. The unit of the spatial length that the servo track pitch is regarded as 1 is denoted as Svtrk.

In the example illustrated in FIG. 4, each of the N burst NB and the Q burst QB has a configuration in which the first unit patterns and the second unit patterns are alternated in each of the radial direction and the circumferential direction. In the radial direction, each unit pattern has a length of 1 Svtrk.

The N burst NB is recorded such that the boundary between the first unit pattern and the second unit pattern coincides with the track center. Therefore, when the magnetic head 22 passes over the track center, the amplitude of the read waveform of the N burst NB is minimum (ideally, zero). When the magnetic head 22 passes over a position that is offset from the track center by 0.5 Svtrk, the amplitude of the read waveform of the N burst NB is maximum.

Hereinafter, a boundary between the first unit pattern and the second unit pattern in the radial direction is denoted as a pattern boundary.

The Q burst QB is recorded such that the pattern boundary coincides with a position that is offset from the track center by 0.5 Srvtrk. Therefore, when the magnetic head 22 passes over the track center, the amplitude of the read waveform of the Q burst QB is maximum. Moreover, when the magnetic head 22 passes over a position that is offset from the track center by 0.5 Svtrk, the amplitude of the read waveform of the Q burst QB is minimum (ideally, zero).

A partial area PN is a normal read part of the area in which the N burst NB is recorded. A partial area PQ is a normal read part in the area in which the Q burst QB is recorded.

The SoC 30 is configured to obtain a correct burst offset by demodulating the read waveform of the N burst NB read from the partial area PN and the read waveform of the Q burst QB read from the partial area PQ. Therefore, the delay times dn and ds and various setting times are set so that the burst gate signal BG can rise at the timing when the magnetic head 22 reaches the head of the partial area PN, fall at the timing when the magnetic head 22 reaches the end of the partial area PN, rise at the timing when the magnetic head 22 reaches the head of the partial area PQ, and fall at the timing when the magnetic head 22 reaches the end of the partial area PQ.

The delay time ds is significantly longer than the delay time dn or the like. Therefore, in the short servo sector SSV, the read timing of each burst pattern tends to deviate from the normal timing, namely, the timing at which the partial area PN and the partial area PQ can be read due to the influence of the rotational fluctuation of the magnetic disk 11 or the like. Even when the RWC 25 raises the burst gate signal BG at the timing when the delay time dn elapses from the timing t0, for example, in a case where the rotational fluctuation of the magnetic disk 11 occurs in a period from the timing t0 until the delay time dn elapses, each timing when the burst gate signal BG rises may deviate from the timing when the magnetic head 22 reaches the head of the partial area PN or the partial area PQ. In short, the read timing of each burst pattern may deviate from the normal timing.

If the read timing of each burst pattern deviates from the normal timing, the demodulation result of each burst pattern fluctuates, and the demodulation position calculated on the basis of the demodulation result of each burst pattern may be incorrect. Then, if an incorrect demodulation position is used for positioning control, accuracy of positioning control is deteriorated.

For example, in FIG. 4, the same read waveforms are observed between a case where the position of the magnetic head 22 deviates by 1. Svtrk in the radial direction and a case where the read timing of the burst pattern defined by the burst gate signal BG deviates by a time corresponding to one unit pattern (namely, the first unit pattern or the second unit pattern). Therefore, it is difficult to determine whether the burst offset obtained on the basis of the read waveform is an incorrect burst offset caused by the deviation of the read timing of the burst pattern, or the position of the magnetic head 22 actually deviates in the radial direction.

Considering the above, the SoC 30 is configured to execute the operation of correcting the initial phase in a case where the phase (hereinafter, denoted as an initial phase) obtained by performing the DFT process on the read waveform deviates due to the deviation of the read timing of the burst pattern. This operation is denoted as an initial phase correction operation.

Figure 5:
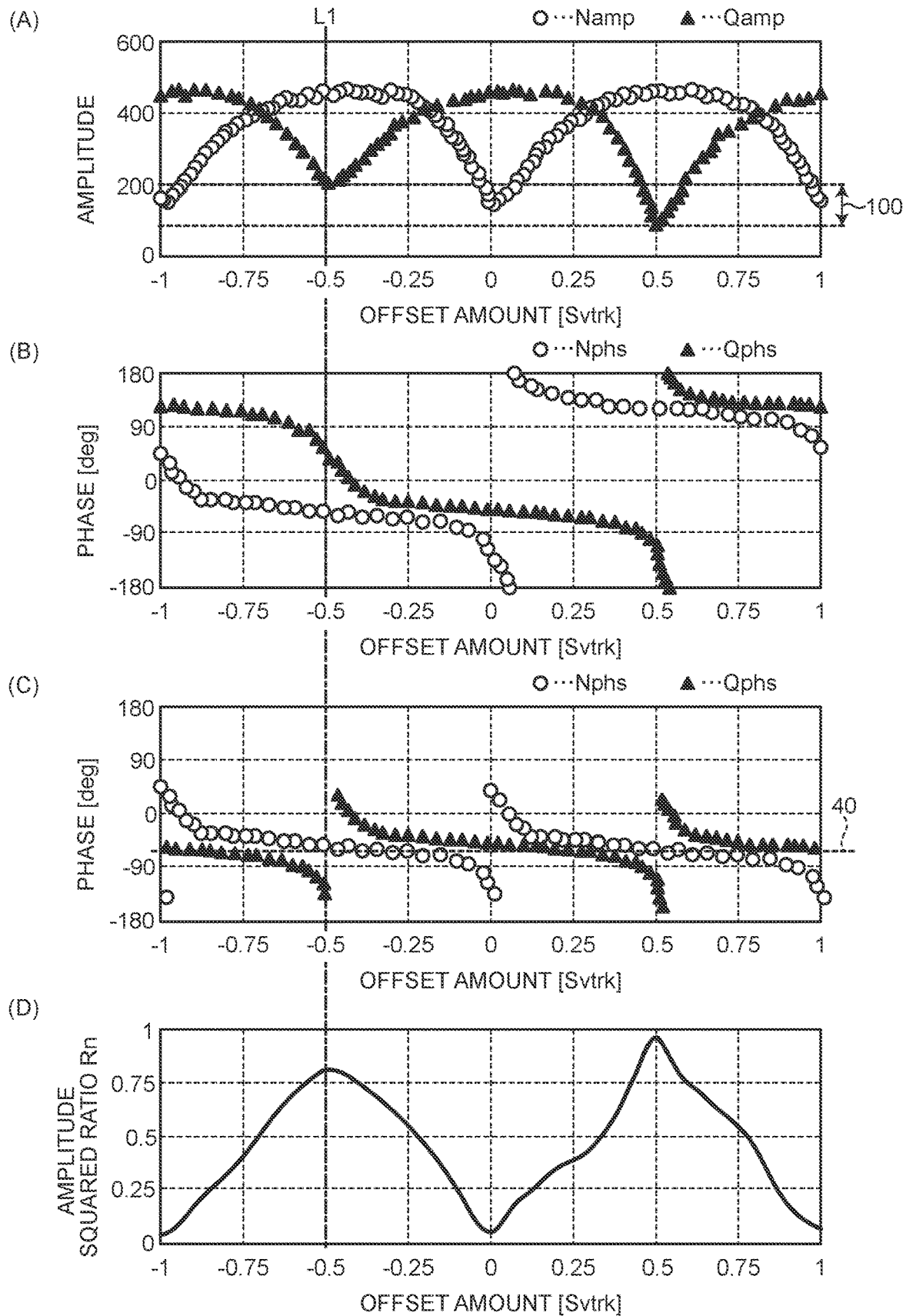
FIG. 5 is a diagram for describing an initial phase operation according to the first embodiment.

FIG. 5 is a diagram for describing an initial phase operation according to the first embodiment.

Part (A) of FIG. 5 is a graph illustrating a relationship between the offset amount from the track center and the amplitude obtained by performing the DFT process on the read waveform of each burst pattern. The amplitude obtained from the read waveform of the N burst NB is denoted as Namp. The amplitude obtained from the read waveform of the Q burst QB is denoted as Qamp.

As illustrated in part (A), the amplitude Namp is minimum around each track center and is maximum around each position that is offset from the track center by 0.5 Svtrk. The amplitude Qamp is minimum around each position shifted by 0.5 Svtrk from the track center, and is maximum around each track center.

Part (B) of FIG. 5 is a graph illustrating a relationship between the offset amount from the track center and the phase obtained by performing the DFT process on the read waveform of each burst pattern. The phase obtained from the read waveform of the N burst NB is denoted as Nphs. The phase obtained from the read waveform of the Q burst QB is denoted as Qphs.

The SoC 30 corrects the phase Nphs and the phase Qphs such that a difference between the phase Nphs and the phase Qphs falls within 90 degrees with respect to the phase illustrated in part (B) FIG. 5. This correction is denoted as a folding operation. Details of the folding operation will be described later.

Part (C) of FIG. 5 is a graph illustrating a relationship between the offset amount from the track center and the phase Nphs and the phase Qphs after the folding operation.

As illustrated in part (C), each of the phase Nphs and the phase Qphs takes a value close to the initial phase at a position where the amplitude is maximum. However, at a position where a large amplitude cannot be obtained, particularly at a pattern boundary, each of the phase Nphs and the phase Qphs takes a value greatly deviated from the initial phase.

In order to calculate the initial phase from the phase Nphs and the phase Qphs, the SoC 30 first calculates an amplitude squared ratio that is a ratio between a value obtained by squaring the amplitude Namp and a value obtained by squaring the amplitude Qamp. Here, as an example, the ratio Rn related to the N burst NB obtained by the following Expression (1) is applied as the amplitude squared ratio.

$$Rn = Namp^2/(Namp^2 + Qamp^2) \qquad (1)$$

Note that the ratio Rn for the N burst NB and the ratio Rq for the Q burst QB have a relationship shown in Expression (2). The ratio Rq for the Q burst QB may be applied as an amplitude squared ratio to be used in subsequent processing.

$$Rn + Rq = 1 \qquad (2)$$

Part (D) of FIG. 5 is a graph illustrating a relationship between the offset amount of a certain servo track 41 from the track center and the amplitude squared ratio Rn. As illustrated in the figure, the amplitude squared ratio Rn takes a value close to 0 at the pattern boundary of the N burst NB and takes a value close to 1 at the pattern boundary of the Q burst QB. Then, the amplitude squared ratio Rn changes substantially linearly with respect to the offset amount between the pattern boundary of the N burst NB and the pattern boundary of the Q burst QB.

The SoC 30 calculates a weight Nwt to be applied to the phase Nphs and a weight Qwt to be applied to the phase Qphs on the basis of the amplitude squared ratio Rn. Then, the SoC 30 acquires the initial phase correction value by calculating the weighted average using the weights Nwt and Qwt and the phases Nphs and Qphs.

Note that the initial phase correction value is a value subtracted from the phase in order to set the initial phase to 0 degrees. In the example illustrated in FIG. 5, it can be read that the initial phase is approximately minus 60 degrees from the phase Nphs and the phase Qphs at the position where the amplitude is maximum. When the initial phase is minus 60 degrees, the initial phase correction value is minus 60 degrees.

A technique compared with that of the embodiment will be described. A technique compared with that of the embodiment is denoted as a comparative example.

According to the comparative example, the relationship between the amplitude squared ratio Rn and the weights Nwt and Qwt is defined by the weight table. The weight table according to the comparative example is configured such that the weight Nwt is set to 0 when the amplitude squared ratio Rn is 0, the weight Nwt is set to 1 when the amplitude squared ratio Rn is 1, the weight Nwt is closer to 0 as the amplitude squared ratio Rn is closer to 0, and the weight Nwt is closer to 1 as the amplitude squared ratio Rn is closer to 1. Then, the weight Qwt is calculated by the following Expression (3).

$$Qwt=1-Nwt \tag{3}$$

As illustrated in part (C) of FIG. 5, in each of the N burst NB and the Q burst QB, as the magnetic head 22 approaches the pattern boundary, the phase of the read waveform deviates from the actual initial phase. According to the comparative example, the weight Nwt decreases as the magnetic head 22 approaches the pattern boundary of the N burst NB, and the weight Qwt decreases as the magnetic head 22 approaches the pattern boundary of the Q burst QB. Therefore, it is possible to suppress the influence of the phase greatly deviated from the actual initial phase obtained at the pattern boundary on the calculation value of the initial phase.

As described above, ideally, the amplitude Namp is 0 at the pattern boundary of the N burst NB, and the amplitude Qamp is 0 at the pattern boundary of the Q burst QB. However, in practice, the pattern boundary may be ambiguous due to poor write quality of each unit pattern (the first unit pattern and the second unit pattern), whereby the amplitude Namp may be larger than 0 at the pattern boundary of the N burst NB, and the amplitude Qamp may be larger than 0 at the pattern boundary of the Q burst QB.

In the example illustrated in FIG. 5, the amplitude at the pattern boundary, namely, the minimum value of the amplitude is distributed in a range 100 larger than 0. In the comparative example, when the amplitude that should ideally be 0 at the pattern boundary takes a value significantly larger than 0, the amplitude squared ratio Rn takes a value deviating from 0 or 1. As a result, a weight larger than 0 to some extent is applied to the phase greatly deviated from the actual initial phase, and the calculation value of the initial phase is affected by the phase greatly deviated from the actual initial phase, and the accuracy of the calculation of the initial phase is deteriorated.

For example, in the example illustrated in FIG. 5, the position L1 where the offset amount is minus 0.5 Svtrk corresponds to the pattern boundary of the Q burst QB. At this position L1, the amplitude Qamp reaches the largest value in the range 100 in which the minimum values of the amplitude are distributed, whereby the amplitude squared ratio Rn, which should ideally be 1, takes a value greatly deviating from 1.

As described above, the weight table of the comparative example is configured such that the weight Nwt takes 0 when the amplitude squared ratio Rn is 0, the weight Nwt takes 1 when the amplitude squared ratio Rn is 1, the weight Nwt is closer to 0 as the amplitude squared ratio Rn is closer to 0, and the weight Nwt is closer to 1 as the amplitude squared ratio Rn is closer to 1. Therefore, at the position L1, since the amplitude squared ratio Rn deviates from 1, the weight Nwt takes a value deviated from 1, and the weight Qwt takes a value deviated from 0. Ideally, the weight Qwt takes a value deviated from 0 at the position L1 where the weight Qwt should be 0, so that the weight Qwt larger than 0 is applied to the phase Qphs greatly deviated from the actual initial phase. As a result, the calculation value of the initial phase is affected by the phase Qphs, and the accuracy of the calculation of the initial phase is deteriorated.

As described above, according to the comparative example, the accuracy of the calculation value of the initial phase may deteriorate when the magnetic head 22 passes over the pattern boundary. This may cause deterioration in the accuracy of positioning control.

Therefore, in the embodiment, the SoC 30 is configured to acquire the weights Nwt and Qwt by using not only the amplitude squared ratio Rn but also the difference between the phase Nphs and the phase Qphs.

A method of acquiring the weights Nwt and Qwt based on the difference between the phase Nphs and the phase Qphs will be described with reference to FIGS. 6 and 7. Hereinafter, the absolute value of the difference between the phase Nphs and the phase Qphs is denoted as an absolute value of the phase difference.

Figure 6:
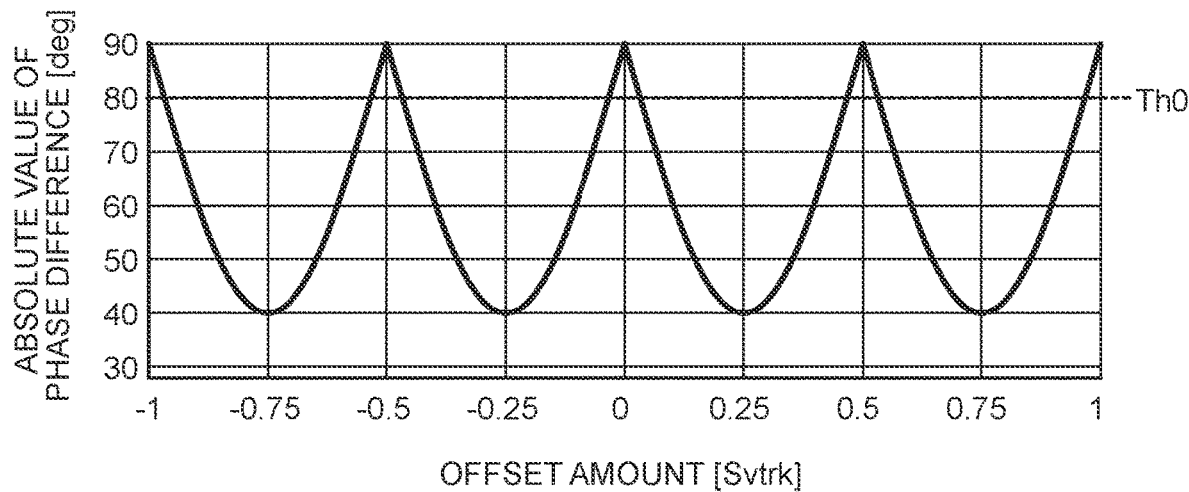
FIG. 6 is a diagram illustrating an example of a relationship between the offset amount from the track center and the absolute value of the phase difference.

FIG. 6 is a diagram illustrating an example of a relationship between an offset amount of a certain servo track 41 from a track center and an absolute value of a phase difference. As illustrated in the figure, the absolute value of the phase difference reaches 90 degrees, which is the maximum value, at each pattern boundary (namely, each track center) of the N burst NB and each pattern boundary (namely, each position that is offset from the track center by 0.5 Svtrk) of the Q burst QB. Between the pattern boundaries, the absolute value of the phase difference decreases in accordance with the distance from the pattern boundary.

In the SoC 30, a certain value Th0 smaller than 90 degrees is set as a threshold value. The SoC 30 compares the absolute value of the phase difference with the threshold value Th0. The absolute value of the phase difference being larger than the threshold value Th0 means that the magnetic head 22 has passed over a certain pattern boundary. However, the amplitude squared ratio Rn may deviate from 0 or 1 depending on the pattern quality. The absolute value of the phase difference being smaller than the threshold value Th0 means that the magnetic head 22 has passed over a place away from the pattern boundary, and means that the magnetic head 22 is located at a place where the amplitude squared ratio Rn deviates from 0 or 1, in other words, at a place where the amplitude squared ratio Rn approaches 0.5. The SoC 30 determines whether to apply the weight table on the basis of a result of comparison between the absolute value of the phase difference and the threshold value Th0. Note that the threshold value Th0 is an example of a first threshold value.

Figure 7:
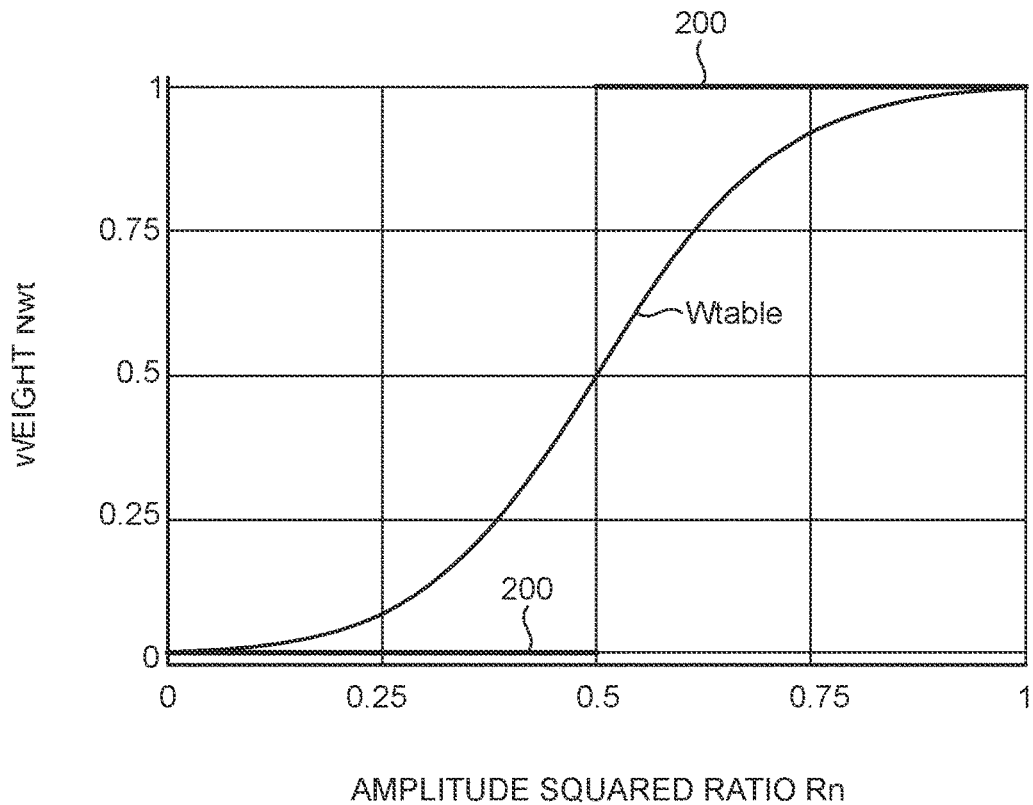
FIG. 7 is a diagram illustrating an example of a method of determining a weight according to the first embodiment.

FIG. 7 is a diagram illustrating an example of a method of determining a weight according to the first embodiment. In the example illustrated in the figure, the weight table Wtable is configured such that the weight Nwt takes 0 when the amplitude squared ratio Rn is 0, the weight Nwt takes 1 when the amplitude squared ratio Rn is 1, the weight Nwt is closer to 0 as the amplitude squared ratio Rn is closer to 0, and the weight Nwt is closer to 1 as the amplitude squared ratio Rn is closer to 1. The weight table Wtable may or may not be the same as the weight table according to the comparative example.

In a case where the absolute value of the phase difference is smaller than the threshold value Th0, the SoC 30 acquires the weights Nwt and Qwt by using the weight table Wtable.

In a case where the absolute value of the phase difference is larger than the threshold value Th0, the SoC 30 sets each of the weights Nwt and Qwt to either 0 or 1.

A relationship 200 indicates a relationship between the amplitude squared ratio Rn and the weight Nwt in a case where the amplitude squared ratio Rn is larger than 0.5. As illustrated in the relationship 200, in a case where the amplitude squared ratio Rn is larger than 0.5, the SoC 30 sets the weight Nwt to 1 and sets the weight Qwt to 0. In a case where the amplitude squared ratio Rn is smaller than 0.5, the SoC 30 sets the weight Nwt to 0 and sets the weight Qwt to 1.

Specifically, the SoC 30 sets the weight Nwt to 0 when it is estimated that the magnetic head 22 has passed over the pattern boundary of the N burst NB, and sets the weight Qwt to 0 when it is estimated that the magnetic head 22 has passed over the pattern boundary of the Q burst QB. As a result, it is possible to completely suppress the influence of the phase greatly deviated from the initial phase on the calculation value of the initial phase at the pattern boundary, and to suppress the deterioration of the accuracy of the calculation of the initial phase.

Note that, in a case where the absolute value of the phase difference is equal to the threshold value Th0, the SoC 30 may execute the same processing as in a case where the absolute value of the phase difference is smaller than the threshold value Th0, or may execute the same processing as in a case where the absolute value of the phase difference is larger than the threshold value Th0. Hereinafter, it is assumed that, in the case where the absolute value of the phase difference is equal to the threshold value Th0, the SoC 30 executes the same processing as in the case where the absolute value of the phase difference is smaller than the threshold value Th0.

Moreover, in a case where the absolute value of the phase difference is larger than the threshold value Th0, and the amplitude squared ratio Rn is equal to 0.5, the SoC 30 may execute the same processing as in a case where the amplitude squared ratio Rn is larger than 0.5, or may execute the same processing as in a case where the amplitude squared ratio Rn is smaller than 0.5. Hereinafter, it is assumed that, in the case where the amplitude squared ratio Rn is equal to 0.5, the SoC 30 executes the same processing as in the case where the amplitude squared ratio Rn is smaller than 0.5.

Figure 8:
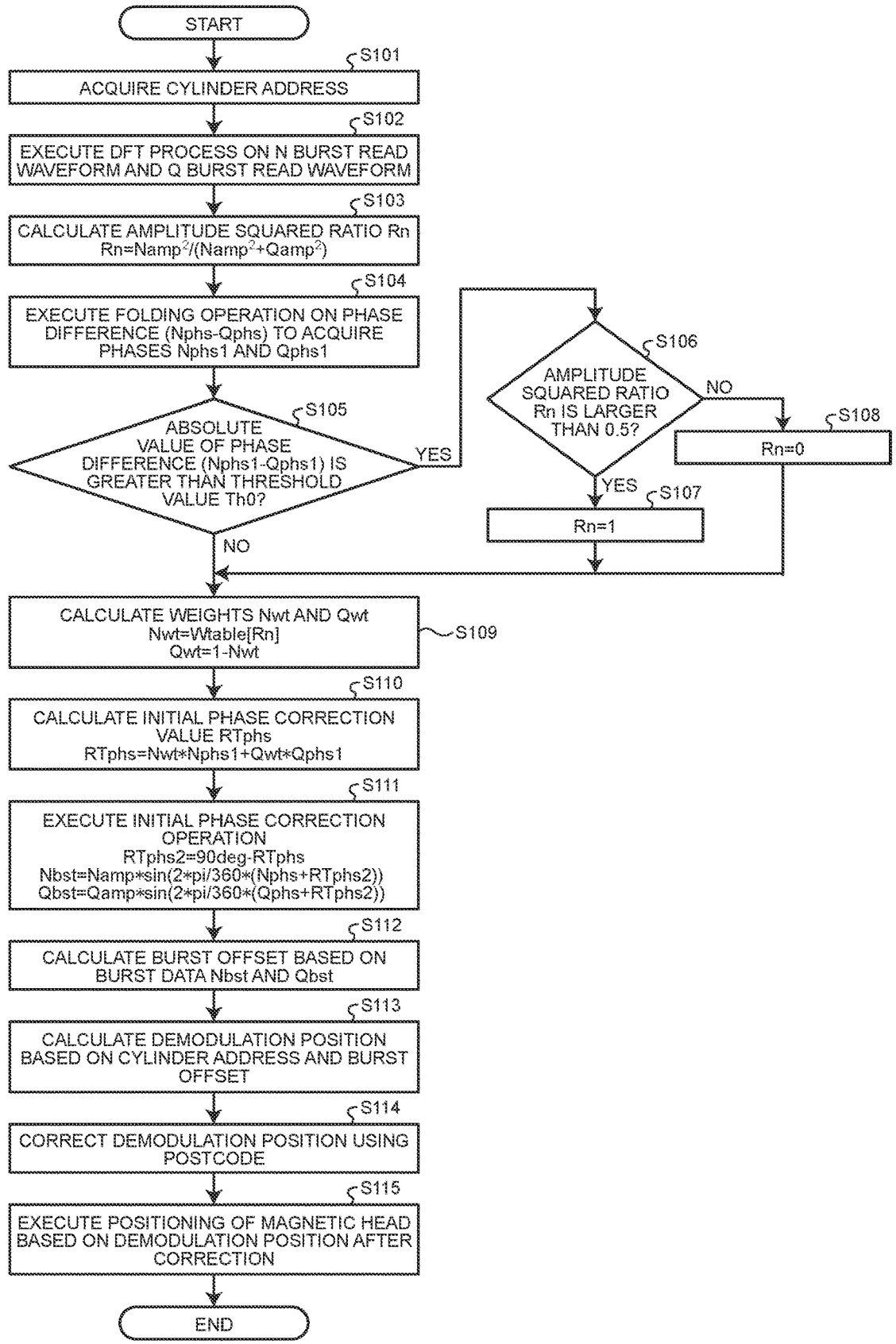
FIG. 8 is a flowchart illustrating an example of an operation of positioning control according to the first embodiment.

FIG. 8 is a flowchart illustrating an example of an operation of positioning control according to the first embodiment. Here, a series of operations when the magnetic head 22 passes over one short servo sector SSV is illustrated.

First, the SoC 30 acquires a cylinder address from the gray code GC read by the magnetic head 22 (S101). Subsequently, the SoC 30 executes a DFT process on the read waveform of the N burst NB and the read waveform of the Q burst QB, which have been read in the period during which the burst gate signal BG is maintained at the "H" level (S102). As a result, the SoC 30 acquires the amplitudes Namp and Qamp and the phases Nphs and Qphs.

The SoC 30 calculates an amplitude squared ratio Rn on the basis of the amplitudes Namp and Qamp (S103). The SoC 30 calculates the amplitude squared ratio Rn using the above-described Expression (1).

The SoC 30 executes a folding operation for correcting the phases Nphs and Qphs such that the phase difference (Nphs−Qphs) falls within 90 degrees (S104). The phase Nphs corrected by the folding operation is denoted as a phase Nphs1, and the phase Qphs corrected by the folding operation is denoted as a phase Qphs1. In the folding operation, for example, the following procedure (or program) is executed. RefPhs is an expected value of the initial phase correction value.

Nphs1=Nphs, Qphs1=Qphs
if Nphs1>=90 deg Nphs1=Nphs1-180 deg
elseif Nphs1<-90 deg Nphs1=Nphs1+180 deg
if Qphs1>=90 deg Qphs1=Qphs1-180 deg
elseif Qphs1<-90 deg Qphs1=Qphs1+180 deg
if abs (Nphs1-Qphs1)>90 deg
   if abs (Qphs1-RefPhs)<abs (Nphs1-RefPhs)
     if (Nphs1-Qphs1)<0
       Nphs1=Nphs1+180 deg
     else
       Nphs1=Nphs1-180 deg
   else
     if (Qphs1-Nphs1)<0
       Qphs1=Qphs1+180 deg
     else
       Qphs1=Qphs1-180 deg Subsequently, the SoC 30 determines whether the absolute value of the phase difference (Nphs1−Qphs1) is larger than the threshold value Th0 (S105). This process corresponds to a process in which the magnetic head 22 determines whether the magnetic head 22 has passed over either the pattern boundary of the N burst NB or the pattern boundary of the Q burst QB.

When the absolute value of the phase difference (Nphs1−Qphs1) is larger than the threshold value Th0 (S105: Yes), the SoC 30 determines whether the amplitude squared ratio Rn is larger than 0.5 (S106). This process corresponds to a process that determines whether the magnetic head 22 has passed over the pattern boundary of the N burst NB or the pattern boundary of the Q burst QB.

When the amplitude squared ratio Rn is larger than 0.5 (S106: Yes), it is estimated that the magnetic head 22 has passed over the pattern boundary of the N burst NB. The SoC 30 substitutes 1 for the amplitude squared ratio Rn (S107).

When the amplitude squared ratio Rn is not larger than 0.5 (S106: No), it is estimated that the magnetic head 22 has passed over the pattern boundary of the Q burst QB. The SoC 30 substitutes 0 for the amplitude squared ratio Rn (S108).

Note that, for convenience, in the description of FIG. 8, it is assumed that the weight table Wtable is used for calculation of the weights Nwt and Qwt regardless of whether the absolute value of the phase difference (Nphs1−Qphs1) is larger than the threshold value Th0. However, in a case where the absolute value of the phase difference (Nphs1−Qphs1) is larger than the threshold value Th0, the SoC 30 sets 0 or 1 as the weights Nwt and Qwt as described above. According to the relationship defined by the weight table Wtable, in a case where the amplitude squared ratio Rn is 0, 0 can be acquired as the weight Nwt and 1 can be acquired as the weight Qwt. When the amplitude squared ratio Rn is 1, 1 can be acquired as the weight Nwt and 0 can be acquired as the weight Qwt. In the process of S107 or S108, the SoC 30 sets the amplitude squared ratio Rn to 0 or 1 so that 0 or 1 can be acquired as the weights Nwt and Qwt from the weight table Wtable.

Note that the SoC 30 may set 0 or 1 as the weights Nwt and Qwt without using the weight table Wtable in a case where the absolute value of the phase difference (Nphs1−Qphs1) is larger than the threshold value Th0.

When the absolute value of the phase difference (Nphs1−Qphs1) is not larger than the threshold value Th0 (S105: No), or after the processing of S107 or after the processing of S108, the SoC 30 calculates the weights Nwt and Qwt using the weight table Wtable (S109). Specifically, the SoC 30 acquires the weights Nwt and Qwt using the following Expressions (4) and (5).

$$Nwt=Wtable\ (Rn) \quad (4)$$

$$Qwt=1-Nwt \quad (5)$$

Note that Wtable (Rn) included in Expression (4) represents processing of acquiring the weight Nwt corresponding to the amplitude squared ratio Rn from the weight table Wtable.

Subsequently, the SoC 30 calculates an initial phase correction value (S110). The SoC 30 calculates the initial phase correction value RTphs using the following Expression (6).

$$RTphs=Nwt*Nphs1+Qwt*Qphs1 \quad (6)$$

In the present specification, the sign "*" denotes an operator meaning multiplication.

Subsequently, the SoC 30 executes an initial phase correction operation (S111). The SoC 30 corrects the initial phase using the following Expressions (7) to (9). Expression (7) corresponds to processing for obtaining an initial phase correction value, which is performed in a case where calculation using a sine function shown in Expressions (8) and (9) is performed.

$$RTphs2=90deg-RTphs \quad (7)$$

$$Nbst=Namp*sin(2*pi/360*(Nphs+RTphs2)) \quad (8)$$

$$Qbst=Qamp*sin(2*pi/360*(Qphs+RTphs2)) \quad (9)$$

With this initial phase correction operation, the SoC 30 can acquire the burst data Nbst in which the deviation of the initial phase is appropriately corrected from the read waveform of the N burst NB and the burst data Qbst in which the deviation of the initial phase is appropriately corrected from the read waveform of the Q burst QB.

The SoC 30 calculates a burst offset on the basis of the burst data Nbst and Qbst (S112).

The SoC 30 calculates a demodulation position on the basis of the cylinder address acquired by the process of S101 and the burst offset acquired by the process of S112 (S113). Moreover, the SoC 30 corrects the demodulation position using the post code PC (S114).

The SoC 30 executes positioning of the magnetic head 22 using the corrected demodulation position as the current estimated position of the magnetic head 22 (S115). The operation when the magnetic head 22 passes over one short servo sector SSV ends.

Figure 9:
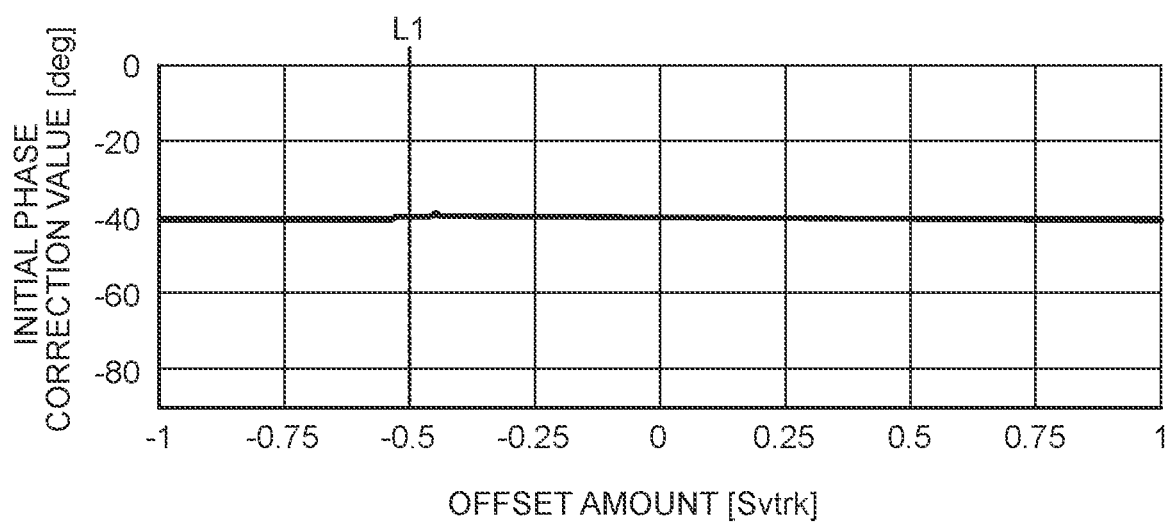
FIG. 9 is a diagram illustrating an initial phase obtained by the series of operations illustrated in FIG. 8.

FIG. 9 is a diagram illustrating an initial phase obtained by the series of operations illustrated in FIG. 8. In FIG. 9, the horizontal axis represents the offset amount of the servo track 41 identified by the gray code GC from the track center, and the vertical axis represents the initial phase obtained by the series of operations illustrated in FIG. 8. Note that the example illustrated in this figure corresponds to the example illustrated in each part of FIG. 5.

As shown in FIG. 9, an initial phase of approximately minus 40 degrees is obtained regardless of the offset amount. Even at a position L1 which is a pattern boundary of the Q burst QB and at which the amplitude Qamp greatly deviates from 0, a value close to minus 40 degrees is obtained as the initial phase. Thus, it is understood that the initial phase is accurately obtained.

Accordingly, the initial phase is accurately obtained even at the pattern boundary. Therefore, deterioration in the accuracy of positioning control at the pattern boundary can be suppressed, and accuracy of positioning control can be enhanced.

As described above, according to the first embodiment, upon the magnetic head 22 passes over the short servo sector SSV, the SoC 30 identifies the read timing of the N burst NB and the Q burst QB, and reads the N burst NB and the Q burst QB from the short servo sector SSV at the identified read timing. The SoC 30 acquires the amplitude Namp, the phase Nphs, the amplitude Qamp, and the phase Qphs by demodulating the read waveform of the N burst NB and the read waveform of the Q burst QB. The SoC 30 acquires the weights Nwt and Qwt on the basis of the amplitude Namp, the phase Nphs, the amplitude Qamp, and the phase Qphs. Then, the SoC 30 corrects the initial phase of each of the read waveform of the N burst NB and the read waveform of the Q burst QB by calculating the weighted average using the phases Nphs and Qphs and the weights Nwt and Qwt. The SoC 30 executes positioning of the magnetic head 22 on the basis of the read waveform of the N burst NB and the read waveform of the Q burst QB, each of whose initial phase has been corrected.

Therefore, even when the amplitude Namp or the amplitude Qamp greatly deviates from 0 at the pattern boundary of the N burst NB or the pattern boundary of the Q burst QB, it is possible to perform control to set the weights Nwt and Qwt to 1 or 0 on the basis of the phases Nphs and Qphs. It is possible to accurately calculate the initial phase at each pattern boundary, and the positioning accuracy at each pattern boundary is enhanced. Thus, a magnetic disk apparatus with high positioning control accuracy can be obtained.

Moreover, according to the first embodiment, the SoC 30 determines, on the basis of the phase Nphs (more precisely, the phase Nphs1) and the phase Qphs (more precisely, the phase Qphs1), whether the magnetic head 22 has passed over the pattern boundary of the N burst NB or the pattern boundary of the Q burst QB. In response to determining that the magnetic head 22 has passed over the pattern boundary of the N burst NB, the SoC 30 sets the weight Nwt to 0. In response to determining that the magnetic head 22 has passed over the pattern boundary of the Q burst QB, the SoC 30 sets the weight Qwt to 0.

Therefore, it is possible to completely suppress the influence of the phase largely deviated from the initial phase on the calculation value of the initial phase at the pattern boundary. As a result, the positioning accuracy at each pattern boundary is enhanced.

Moreover, according to the first embodiment, when the absolute value of the difference between the phase Nphs (more precisely, the phase Nphs1) and the phase Qphs (more precisely, the phase Qphs1) is larger than the threshold value Th0, the SoC 30 determines that the magnetic head 22 has passed over the pattern boundary of the N burst NB or the pattern boundary of the Q burst QB. When the absolute value of the difference between the phase Nphs (more precisely, the phase Nphs1) and the phase Qphs (more precisely, the phase Qphs1) is smaller than the threshold value Th0, the SoC 30 determines that the magnetic head 22 has not passed over any place of the pattern boundary of the N burst NB and the pattern boundary of the Q burst QB.

Moreover, according to the first embodiment, in a case where the absolute value of the difference between the phase Nphs (more precisely, the phase Nphs1) and the phase Qphs (more precisely, the phase Qphs1) is larger than the threshold value Th0, the SoC 30 operates as follows. When the amplitude squared ratio Rn is smaller than 0.5, in other words, when the value obtained by squaring the amplitude Namp is smaller than the value obtained by squaring the amplitude Qamp, the SoC 30 determines that the magnetic head 22 has passed over the pattern boundary of the N burst NB. When the amplitude squared ratio Rn is larger than 0.5, in other words, when the value obtained by squaring the amplitude Namp is larger than the value obtained by squaring the amplitude Qamp, the SoC 30 determines that the magnetic head 22 has passed over the pattern boundary of the Q burst QB.

Moreover, according to the first embodiment, in a case where the absolute value of the difference between the phase Nphs (more precisely, the phase Nphs1) and the phase Qphs (more precisely, the phase Qphs1) is smaller than the threshold value Th0, the SoC 30 operates as follows. The SoC 30 acquires the weights Nwt and Qwt on the basis of the weight table Wtable that defines the relationship between the amplitude squared ratio Rn and the weights Nwt and Qwt such that the weight Nwt approaches 1 and the weight Qwt approaches 0 as the amplitude squared ratio Rn is close to 1 and the weight Nwt approaches 0 and the weight Qwt approaches 1 as the amplitude squared ratio Rn is close to 0.

In the first embodiment, in response to determining that the magnetic head 22 has passed over a place other than a pattern boundary, the SoC 30 acquires the weights Nwt and Qwt on the basis of the amplitude squared ratio Rn and the weight table Wtable. The method of acquiring the weights Nwt and Qwt in the case where the magnetic head 22 has passed over a place other than a pattern boundary is not limited thereto.

For example, a weight table (denoted as a weight table Wtable') is configured to associate the ratio between the amplitude Namp and the amplitude Qamp, instead of the amplitude squared ratio Rn, with the weight Nwt or the weight Qwt. In such a case, the SoC 30 acquires the weights Nwt and Qwt on the basis of the ratio between the amplitude Namp and the amplitude Qamp and the weight table Wtable'.

As described above, the SoC 30 is configured to acquire the weights Nwt and Qwt on the basis of the amplitudes Namp and Qamp in response to determining that the magnetic head 22 has passed over a place that is not a pattern boundary.

In addition, according to the first embodiment, the servo sectors SV provided in the circumferential direction of the magnetic disk 11 includes the normal servo sector NSV and the short servo sector SSV. The SoC 30 identifies the read timing of the N burst NB and the Q burst QB in the short servo sector SSV on the basis of the timing at which the servo mark SM is detected from the normal servo sector NSV. Then, the SoC 30 executes a series of operations illustrated in FIG. 8 on the basis of the read waveform of each burst pattern read at the read timing.

Note that the SoC 30 may also execute a series of operations illustrated in FIG. 8 when the magnetic head 22 passes over the normal servo sector NSV. Moreover, when the magnetic head 22 passes over the normal servo sector NSV, the SoC 30 may skip the processing of S103 to S111 and execute the processing of S112 and subsequent processing by using the burst data before the initial phase correction operation.

In addition, the first embodiment can also be applied to a magnetic disk apparatus in which all servo sectors SV are configured as normal servo sectors NSV. In such a magnetic disk apparatus, the SoC may execute a series of operations illustrated in FIG. 8 in each servo sector SV.

Moreover, in a magnetic disk apparatus in which all servo sectors SV are configured as normal servo sectors NSV, the SoC may identify a timing at which the burst gate signal BG in another servo sector SV is raised on the basis of the servo mark found signal SMF in a certain servo sector SV. In a case where the SoC identifies the rising timing of the burst gate signal BG in another servo sector SV on the basis of the servo mark found signal SMF in a certain servo sector SV, the SoC may perform positioning control by a series of operations illustrated in FIG. 8.

Second Embodiment

In the first embodiment, one weight table Wtable is set in the SoC 30, and the SoC 30 acquires the weights Nwt and Qwt by using the one weight table Wtable. The SoC 30 may be configured to be able to handle two or more weight tables.

In the second embodiment, an example in which the SoC is configured to use multiple weight tables will be described. Here, matters different from those of the first embodiment will be described, and description of the same matters as those of the first embodiment will be omitted or briefly described. The SoC according to the second embodiment is denoted as a SoC 30a.

Figure 10:
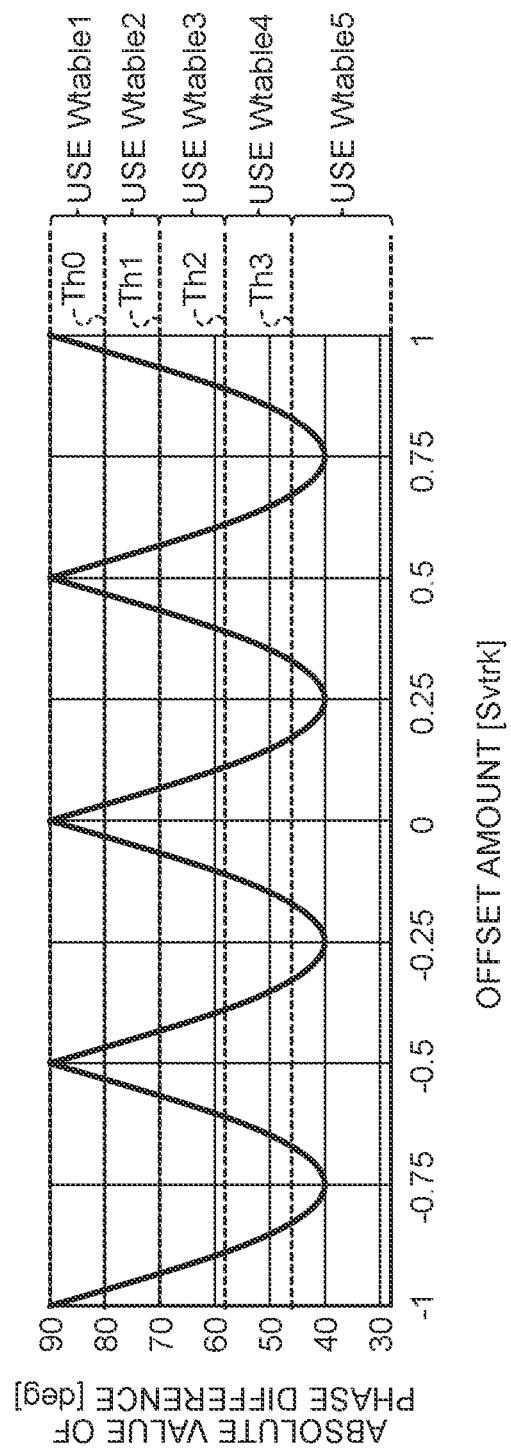
FIG. 10 is a diagram for describing an example of a method of selection from multiple weight tables according to the second embodiment.

FIG. 10 is a diagram for describing an example of a method of selection from multiple weight tables according to the second embodiment. In the figure, the horizontal axis represents the offset amount from the track center, and the vertical axis represents the absolute value of the phase difference (Nphs1-Qphs1).

As illustrated in FIG. 10, in the second embodiment, threshold values Th0 to Th3 including the threshold value Th0 corresponding to the first threshold value according to the above-described first embodiment are set in the SoC 30a. The threshold value Th1 is smaller than the threshold value Th0, the threshold value Th2 is smaller than the threshold value Th1, and the threshold value Th3 is smaller than the threshold value Th2.

In a case where the absolute value of the phase difference is larger than the threshold value Th0, the SoC 30a uses a weight table Wtable1. When the absolute value of the phase difference is smaller than the threshold value Th0 and larger than the threshold value Th1, the SoC 30a uses a weight table Wtable2. When the absolute value of the phase difference is smaller than the threshold value Th1 and larger than the threshold value Th2, the SoC 30a uses a weight table Wtable3. When the absolute value of the phase difference is smaller than the threshold value Th2 and larger than the threshold value Th3, the SoC 30a uses a weight table Wtable4. In a case where the absolute value of the phase difference is smaller than the threshold value Th3, the SoC 30a uses a weight table Wtable5.

In a case where the absolute value of the phase difference is equal to the threshold value Th0, the SoC 30a may use the weight table Wtable1 or may use the weight table Wtable2. In a case where the absolute value of the phase difference is equal to the threshold value Th1, the SoC 30a may use the weight table Wtable2 or may use the weight table Wtable3. In a case where the absolute value of the phase difference is equal to the threshold value Th2, the SoC 30a may use the weight table Wtable3 or may use the weight table Wtable4. In a case where the absolute value of the phase difference is equal to the threshold value Th3, the SoC 30a may use the weight table Wtable4 or may use the weight table Wtable5.

As described above, in the second embodiment, the SoC 30a selects the weight table to be used, from among the weight tables Wtable to Wtable5, on the basis of the absolute value of the phase difference. Note that, hereinafter, in the notation of the weight table WtableX (in the example of FIG. 10, X is an integer of 1 or more and 5 or less), X is referred to as a table number.

Figure 11:
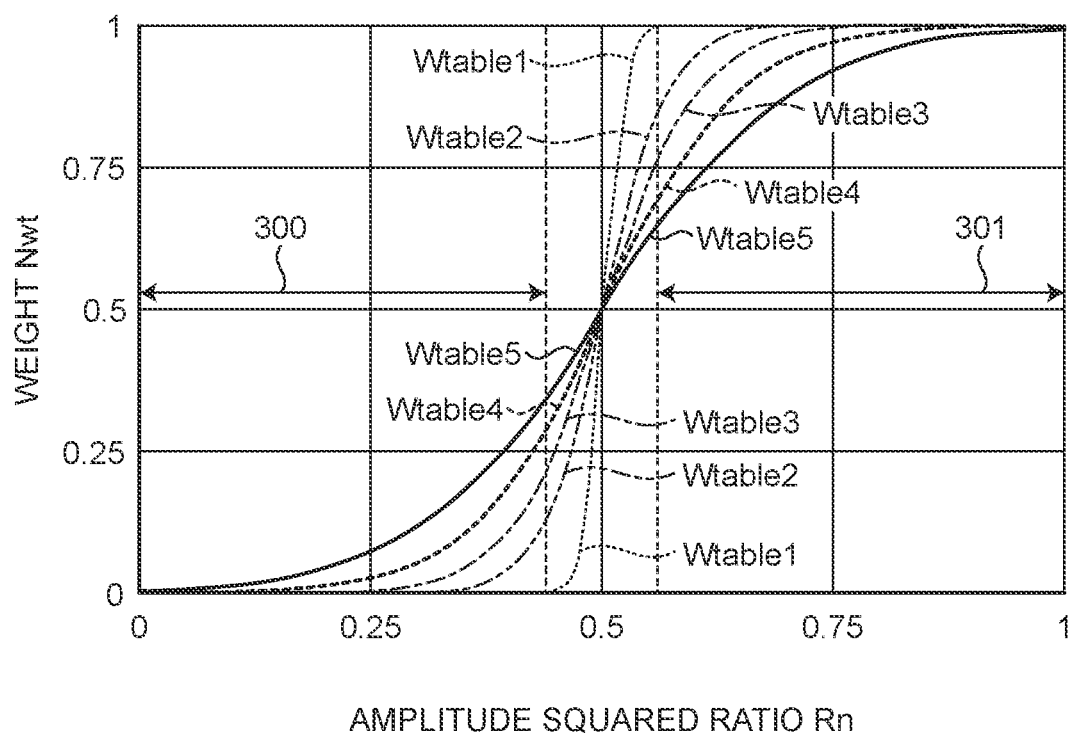
FIG. 11 is a diagram illustrating an example of a configuration of weight tables according to the second embodiment.

FIG. 11 is a diagram illustrating an example of a configuration of the weight tables Wtable1 to Wtable5 according to the second embodiment.

In the weight table Wtable1, which is a weight table used in a case where the absolute value of the phase difference is larger than the threshold value Th0, a relationship between the amplitude squared ratio Rn and the weight Nwt is defined such that the weight Nwt is set to 0 in a first range 300 close to 0 in a range of the amplitude squared ratio Rn from 0 to 1, and the weight Nwt is set to 1 in a second range 301 close to 1 in a range of the amplitude squared ratio Rn from 0 to 1. The weight Nwt and the weight Qwt satisfy the relationship shown in Expression (5). Therefore, according to the weight table Wtable1, the weight Qwt is set to 1 in the first range 300, and the weight Qwt is set to 0 in the second range 301.

Therefore, the weight table Wtable1 is configured such that the weights Nwt and Qwt are set to 0 or 1 in a predetermined range of the amplitude squared ratio Rn close to 0 or 1. Therefore, even when the amplitude squared ratio Rn greatly deviates from the ideal value (0 or 1) at the pattern boundary, the SoC 30a can completely suppress the influence of the large deviation of the phase of the read waveform at the pattern boundary from the actual initial phase.

Each of the weight tables Wtable2 to Wtable5 is configured such that the weight Nwt is set to 0 when the amplitude squared ratio Rn is 0, the weight Nwt is set to 1 when the amplitude squared ratio Rn is 1, the weight Nwt is closer to 0 as the amplitude squared ratio Rn is closer to 0, and the weight Nwt is closer to 1 as the amplitude squared ratio Rn is closer to 1. Then, as the weight table has a larger table number, the gradient of the weight Nwt with respect to the amplitude squared ratio Rn is gentler. In other words, the weight table having a smaller table number has a wider range of the amplitude squared ratio Rn in which the weights Nwt and Qwt are set to 0 or 1 or a value close to 0 or 1. The weight table having a larger table number has a smaller range of the amplitude squared ratio Rn in which the weights Nwt and Qwt are set to 0 or 1 or a value close to 0 or 1.

Note that the weight tables Wtable1 to Wtable5 are an example of pieces of first weight relationship information that are configured such that one piece of first weight relationship information can be selected on the basis of the absolute value of the phase difference. The weight table Wtable1 is an example of the second weight relationship information.

Note that the number of weight tables set in the SoC 30a is optional number as long as it is two or more.

Figure 12:
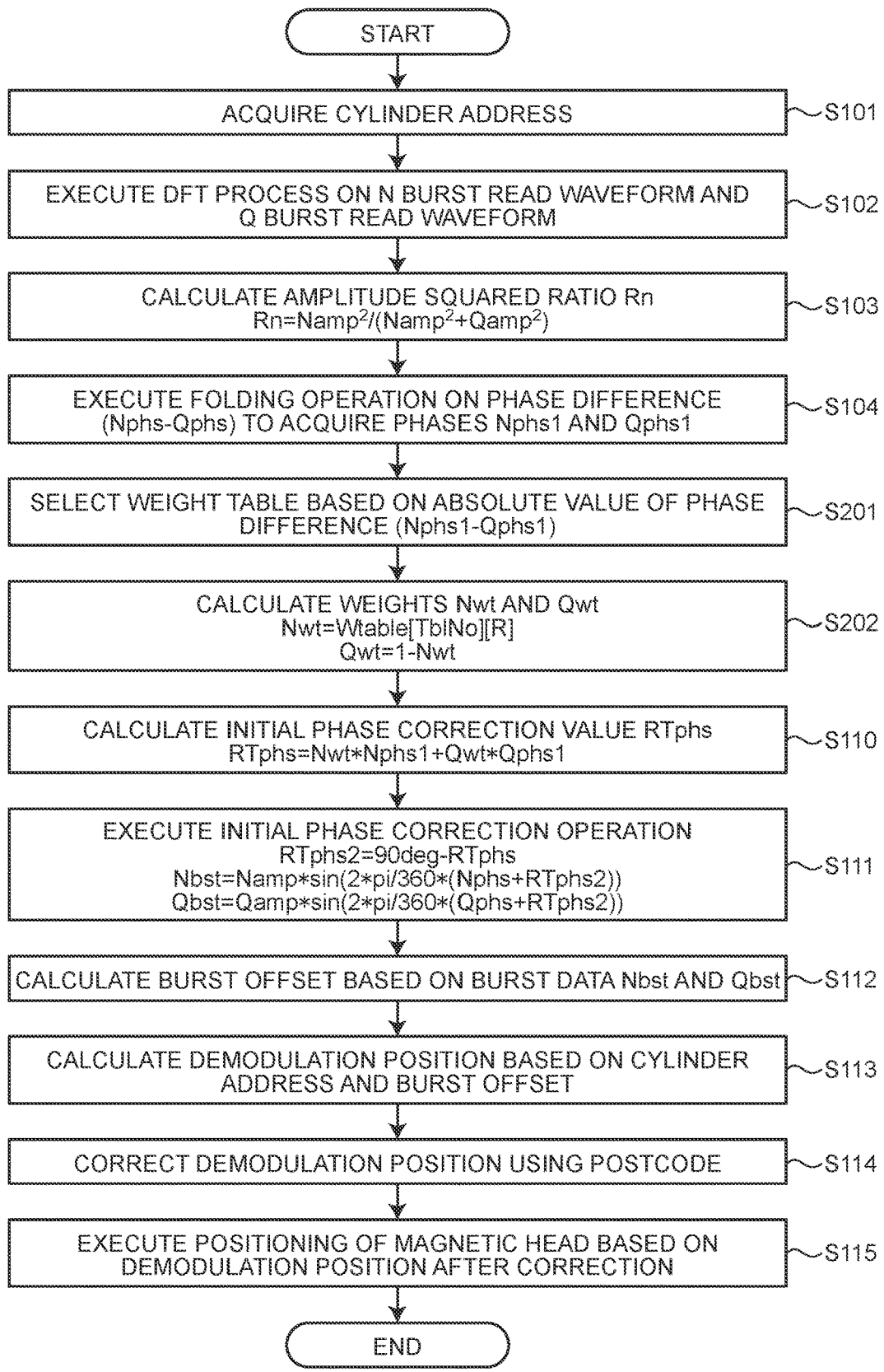
FIG. 12 is a flowchart illustrating an example of an operation of positioning control according to the second embodiment.

FIG. 12 is a flowchart illustrating an example of an operation of positioning control according to the second embodiment.

The operation of the positioning control of the SoC 30a is different from the operation of the positioning control of the SoC 30 according to the first embodiment illustrated in FIG. 8 in that the processing of S201 to S202 is executed instead of the processing of S105 to S109.

In S201, the SoC 30a selects the weight table on the basis of the absolute value of the phase difference (Nphs1-Qphs1). Specifically, the SoC 30a selects one weight table from the weight tables Wtable1 to Wtable5 on the basis of comparison between the absolute value of the phase difference (Nphs1-Qphs1) and the threshold values Th0 to Th3.

In S202, the SoC 30a calculates the weights Nwt and Qwt using the selected weight table. Specifically, the SoC 30 acquires the weights Nwt and Qwt using the following Expressions (10) and (11).

$$Nwt = \text{Wtable (TblNo)}(Rn) \quad (10)$$

$$Qwt = 1 - Nwt \quad (11)$$

TblNo denotes a table number of the weight table selected by the process of S201. Wtable (TblNo) (Rn) represents processing of acquiring the weight Nwt corresponding to the amplitude squared ratio Rn from the weight table with the table number TblNo.

As described above, in the second embodiment, multiple weight tables Wtable1 to Wtable5 are set in the SoC 30a. The weight tables Wtable1 to Wtable5 are configured to allow one of them to be selected on the basis of the absolute value of the phase difference.

Even in a case where the absolute value of the phase difference is less than the threshold value Th0, the quality of the pattern may be affected by the phase deviating from the initial phase in a case where the absolute value of the phase difference is close to the threshold value Th0.

In order to cope with this, it is conceivable to reduce the threshold value Th0. A technique in which the threshold value Th0 is reduced is denoted as a second comparative example. According to the second comparative example, by lowering the threshold value Th0, an area in which only one of the phases Nphs and Qphs is used is widened. Therefore, since both the phases Nphs and Qphs are not used, the accuracy of the calculation of the initial phase correction value may be deteriorated.

On the other hand, according to the second embodiment, the weight tables Wtable1 to Wtable5 are configured to allow one of them to be selected on the basis of the absolute value of the phase difference. Therefore, an area in which only one of the phases Nphs and Qphs is used can be minimized.

Therefore, according to the second embodiment, it is possible to widen the area in which both the phases Nphs and Qphs are used while suppressing the influence of the phase greatly deviated from the initial phase on the calculation value of the initial phase at the pattern boundary. Therefore, it is possible to calculate a more accurate initial phase correction value as compared with the second comparative example.

In the first embodiment and the second embodiment, the SoCs 30 and 30a use one or more weight tables as information defining the relationship between the amplitude squared ratio and the weight. The SoCs 30 and 30a can use any information instead of one or more weight tables as long as the information defines the relationship between the amplitude squared ratio and the weight. For example, instead of one or more weight tables, the SoCs 30 and 30a use one or more mathematical formulas or functions that define the relationship between the amplitude squared ratio and the weight. Note that the information defining the relationship between the amplitude squared ratio and the weight is an example of the weight relationship information.

In addition, in the first embodiment and the second embodiment, a value common to the entire area of the magnetic disk 11 may be used as the first threshold value Th0, or a value that varies with the position of the magnetic disk 11 may be used as the first threshold value Th0. For example, the recording face of the magnetic disk 11 is segmented into plural radial areas in the radial direction. Then, for each radius area, the value of the first threshold value Th0 is set in accordance with the write quality of each unit pattern. The SoCs 30 and 30a may autonomously set the value of the first threshold value Th0, or the value of the first threshold value Th0 may be set by a designer.

As for the threshold values Th1 to Th3 in the second embodiment, as in the first threshold value Th0, a value common to the entire area of the magnetic disk 11 may be used as the first threshold value Th0, or a value different depending on the position of the magnetic disk 11 may be used as the first threshold value Th0. The SoC 30a may autonomously set the values of the threshold values Th1 to Th3, or the threshold values Th1 to Th3 may be set by a designer.

While some embodiments have been described, these embodiments have been presented by way of example only and are not intended to limit the scope of the inventions. Indeed, the novel embodiments described herein can be embodied in a variety of other forms; moreover, various omissions, substitutions and changes can be made without departing from the gist of the inventions. These embodiments or modifications thereof are included in the scope or the gist of the inventions and are included in the inventions described in the claims and an equivalent scope thereof.

What is claimed is:

1. A magnetic disk apparatus comprising:
    a magnetic disk on which multiple servo sectors are provided in a circumferential direction, the multiple servo sectors each storing a first burst pattern and a second burst pattern;
    a magnetic head configured to execute writing and reading on the magnetic disk; and
    a controller configured to, upon the magnetic head passes over a first servo sector being one of the multiple servo sectors,
        identify read timing of the first burst pattern and the second burst pattern,
        read, at the read timing, the first burst pattern and the second burst pattern from the first servo sector,
        acquire a first amplitude and a first phase of a first read waveform and a second amplitude and a second phase of a second read waveform by demodulating the first read waveform and the second read waveform, the first read waveform being a read waveform of the first burst pattern, the second read waveform being a read waveform of the second burst pattern,
        acquire weights on the basis of the first amplitude, the second amplitude, the first phase, and the second phase,
        correct an initial phase of each of the first read waveform and the second read waveform on the basis of an initial phase correction value obtained by weighted average calculation using the weights, the first phase, and the second phase, and
        perform positioning of the magnetic head on the basis of the first read waveform and the second read waveform, each of whose initial phase has been corrected.

2. The magnetic disk apparatus according to claim 1, wherein
    the first burst pattern and the second burst pattern each include first unit patterns and second unit patterns and each have a configuration in which the first unit patterns and the second unit patterns are alternated in a radial direction,
    a radial position of a first boundary in the first burst pattern and a radial position of a second boundary in the second burst pattern are different from each other, the first boundary being a boundary between a first unit pattern and a second unit pattern in the radial direction in the first burst pattern, the second boundary being a boundary between a first unit pattern and a second unit pattern in the radial direction in the second burst pattern,
    the weights includes a first weight to be applied to the first phase and a second weight to be applied to the second phase, and
    the controller is configured to
        determine, on the basis of the first phase and the second phase, whether the magnetic head has passed over the first boundary or the second boundary, and
        set the first weight to zero in response to determining that the magnetic head has passed over the first boundary, and set the second weight to zero in response to determining that the magnetic head has passed over the second boundary.

3. The magnetic disk apparatus according to claim 2, wherein the controller is configured to acquire the first weight and the second weight on the basis of the first amplitude and the second amplitude in response to determining that the magnetic head has passed over neither the first boundary nor the second boundary.

4. The magnetic disk apparatus according to claim 2, wherein the controller is configured to
    make determination that the magnetic head has passed over the first boundary or the second boundary in a case where an absolute value of a difference between the first phase and the second phase is larger than a first threshold value, and
    make determination that the magnetic head has passed over neither the first boundary nor the second boundary in a case where the absolute value is smaller than the first threshold value.

5. The magnetic disk apparatus according to claim 4, wherein, in the case where the absolute value is larger than the first threshold value, the controller is configured to
    make determination that the magnetic head has passed over the first boundary when a value obtained by squaring the first amplitude is smaller than a value obtained by squaring the second amplitude, and
    make determination that the magnetic head has passed over the second boundary when a value obtained by squaring the first amplitude is larger than a value obtained by squaring the second amplitude.

6. The magnetic disk apparatus according to claim 4, wherein, in the case where the absolute value is smaller than the first threshold value, the controller is configured to acquire the first weight and the second weight such that the closer to 1 a ratio obtained by dividing a value obtained by squaring the first amplitude by a sum of a value obtained by squaring the first amplitude and a value obtained by squaring the second amplitude is, the closer to 1 the first weight is and the closer to 0 the second weight is, and the closer to 0 the ratio is, the closer to 0 the first weight is and the closer to 1 the second weight is, the first weight and the second weight being acquired by using weight relationship information defining relationship between the ratio and the weights.

7. The magnetic disk apparatus according to claim 2, wherein the controller is configured to
    store weight relationship information defining a relationship between a ratio obtained by dividing a value obtained by squaring the first amplitude by a sum of a value obtained by squaring the first amplitude and a value obtained by squaring the second amplitude and the first weight and the second weight, and acquire the first weight and the second weight on the basis of
weight relationship information based on an absolute value of a difference between the first phase and the second phase,
the first amplitude, and
the second amplitude.

8. The magnetic disk apparatus according to claim 7, wherein
the weight relationship information includes multiple pieces of first weight relationship information defining relationship between the ratio and the first weight and the second weight, and
the weight relationship information is configured to allow one of the multiple pieces of first weight relationship information to be selected on the basis of an absolute value of the phase difference.

9. The magnetic disk apparatus according to claim 8, wherein the multiple pieces of first weight relationship information includes second weight relationship information in which relationship between the ratio and the weights is defined such that
the first weight is set to 0 and the second weight is set to 1 when the ratio is included in a first range close to 0 in a range from 0 to 1, and
the first weight is set to 1 and the second weight is set to 0 when the ratio is included in a second range close to 1 in a range from 0 to 1.

10. The magnetic disk apparatus according to claim 1, wherein
the multiple servo sectors includes a second servo sector and a third servo sector,
the second servo sector stores a servo mark in addition to the first burst pattern and the second burst pattern,
the first servo sector corresponds to the third servo sector, and
the controller is configured to identify the read timing on the basis of timing at which the servo mark is detected from the second servo sector.

11. The magnetic disk apparatus according to claim 10, wherein the third servo sector stores no servo mark.

12. A method of controlling a magnetic disk apparatus, the magnetic disk apparatus including a magnetic head and a magnetic disk on which multiple servo sectors are provided in a circumferential direction, the multiple servo sectors each storing a first burst pattern and a second burst pattern, the method comprising:
upon the magnetic head passes over a first servo sector being one of the multiple servo sectors,
identifying read timing of the first burst pattern and the second burst pattern;
reading, at the read timing, the first burst pattern and the second burst pattern from the first servo sector;
acquiring a first amplitude and a first phase of a first read waveform and a second amplitude and a second phase of a second read waveform by demodulating the first read waveform and the second read waveform, the first read waveform being a read waveform of the first burst pattern, the second read waveform being a read waveform of the second burst pattern;
acquiring weights on the basis of the first amplitude, the second amplitude, the first phase, and the second phase;
correcting an initial phase of each of the first read waveform and the second read waveform on the basis of an initial phase correction value obtained by weighted average calculation using the weights, the first phase, and the second phase; and
performing positioning of the magnetic head on the basis of the first read waveform and the second read waveform, each of whose initial phase has been corrected.

13. The method according to claim 12, wherein
the first burst pattern and the second burst pattern each include first unit patterns and second unit patterns and each have a configuration in which the first unit patterns and the second unit patterns are alternated in a radial direction and a circumferential direction,
a radial position of a first boundary in the first burst pattern and a radial position of a second boundary in the second burst pattern are different from each other, the first boundary being a boundary between a first unit pattern and a second unit pattern in the radial direction in the first burst pattern, the second boundary being a boundary between a first unit pattern and a second unit pattern in the radial direction in the second burst pattern,
the weights includes a first weight to be applied to the first phase and a second weight to be applied to the second phase, and
the method further comprises:
determining, on the basis of the first phase and the second phase, whether the magnetic head has passed over the first boundary or the second boundary, and
setting the first weight to zero in response to determining that the magnetic head has passed over the first boundary, and setting the second weight to zero in response to determining that the magnetic head has passed over the second boundary.

14. The method according to claim 13, further comprising acquiring the first weight and the second weight on the basis of the first amplitude and the second amplitude in response to determining that the magnetic head has passed over neither the first boundary nor the second boundary.

15. The method according to claim 13, further comprising:
making determination that the magnetic head has passed over the first boundary or the second boundary in a case where an absolute value of a difference between the first phase and the second phase is larger than a first threshold value; and
making determination that the magnetic head has passed over neither the first boundary nor the second boundary in a case where the absolute value is smaller than the first threshold value.

16. The method according to claim 15, further comprising:
in the case where the absolute value is larger than the first threshold value,
making determination that the magnetic head has passed over the first boundary when a value obtained by squaring the first amplitude is smaller than a value obtained by squaring the second amplitude; and
making determination that the magnetic head has passed over the second boundary when a value obtained by squaring the first amplitude is larger than a value obtained by squaring the second amplitude.

17. The method according to claim 15, further comprising:
in the case where the absolute value is smaller than the first threshold value,
acquiring the first weight and the second weight such that the closer to 1 a ratio obtained by dividing a value obtained by squaring the first amplitude by a sum of a value obtained by squaring the first amplitude and a value obtained by squaring the second amplitude is, the closer to 1 the first weight is and the closer to 0 the second weight is, and the closer to 0 the ratio is, the closer to 0 the first weight is and the closer to 1 the second weight is, the first weight and the second weight being acquired by using weight relationship information defining relationship between the ratio and the weights.

18. The method according to claim 13, further comprising:
acquiring weight relationship information defining a relationship between a ratio obtained by dividing a value obtained by squaring the first amplitude by a sum of a value obtained by squaring the first amplitude and a value obtained by squaring the second amplitude and the first weight and the second weight; and
acquiring the first weight and the second weight on the basis of
weight relationship information based on an absolute value of a difference between the first phase and the second phase,
the first amplitude, and
the second amplitude.

19. The method according to claim 18, wherein
the weight relationship information includes multiple pieces of first weight relationship information defining relationship between the ratio and the first weight and the second weight, and
the weight relationship information is configured to allow one of the multiple pieces of first weight relationship information to be selected on the basis of an absolute value of the phase difference.

20. The method according to claim 19, wherein the multiple pieces of first weight relationship information includes second weight relationship information in which relationship between the ratio and the weights is defined such that
the first weight is set to 0 and the second weight is set to 1 when the ratio is included in a first range close to 0 in a range from 0 to 1, and
the first weight is set to 1 and the second weight is set to 0 when the ratio is included in a second range close to 1 in a range from 0 to 1.

* * * * *